United States Patent [19]
Yang et al.

[11] Patent Number: 5,648,987
[45] Date of Patent: Jul. 15, 1997

[54] RAPID-UPDATE ADAPTIVE CHANNEL-EQUALIZATION FILTERING FOR DIGITAL RADIO RECEIVERS, SUCH AS HDTV RECEIVERS

[75] Inventors: Jian Yang, Norwood, Mass.; Chandrakant Bhailalbhai Patel, Hopewell, N.J.; Tianmin Liu, Lawrenceville, N.J.; Allen Le Roy Limberg, Ringoes, N.J.

[73] Assignee: Samsung Electronics Co., Ltd., Kyungki-Do, Rep. of Korea

[21] Appl. No.: 216,936

[22] Filed: Mar. 24, 1994

[51] Int. Cl.$^6$ .............................. H04L 27/01; H04N 5/21
[52] U.S. Cl. ......................... 375/232; 364/724.2; 348/607
[58] Field of Search ........................................ 375/232, 348, 375/350; 364/724.2; 348/604, 607, 725, 909

[56] References Cited

U.S. PATENT DOCUMENTS

| | | | |
|---|---|---|---|
| 4,633,482 | 12/1986 | Sari | 375/232 |
| 4,695,969 | 9/1987 | Sollenberger | 375/232 |
| 4,718,073 | 1/1988 | Takaoka | 364/724.2 |
| 4,811,360 | 3/1989 | Potter | 364/724.2 |
| 5,119,196 | 6/1992 | Ayanoglu et al. | 348/607 |
| 5,243,624 | 9/1993 | Paik et al. | 375/232 |
| 5,392,315 | 2/1995 | Laud | 375/232 |
| 5,416,799 | 5/1995 | Currivan et al. | 375/232 |
| 5,483,552 | 1/1996 | Shimazaki et al. | 375/350 |

OTHER PUBLICATIONS

Proakis, J.G., Digital Communications. New York: McGraw–Hill Book Company, 1989, Figures 6.4.1 and 6.4.4 1989.

Primary Examiner—Stephen Chin
Assistant Examiner—Jeffrey W. Gluck
Attorney, Agent, or Firm—Sughrue, Mion, Zinn, Macpeak & Seas

[57] ABSTRACT

In response to a received carrier wave modulated in accordance with a digital signal, a digital radio receiver recovers in digital form a modulating signal that is at times subject to undesirable amounts of multipath distortion. This recovered modulating signal is applied as respective input signals to first and second finite-impulse-response (FIR) filters, each of an N-tap type, the taps of which are adaptively weighted. The first FIR filter responds to the modulating signal to supply an output signal in which multipath distortion is suppressed. The second FIR filter responds to the modulating signal to generate corrections for the tap weights of the first FIR filter, which corrections are generated more rapidly than can be done with a microprocessor of the type commonly known as a "digital signal processor" or "DSP". A digital comparator compares samples of the first FIR filter response to corresponding samples of an ideal response, thereby to generate updated tap weights for the second FIR filter.

47 Claims, 16 Drawing Sheets

(a) 3RD CLOCK SIGNAL (b) x SIGNAL (c) y SIGNAL (d) e UPDATE SIGNAL (e) 2ND CLOCK SIGNAL (f) x SIGNAL WITH (L+N) SAMPLE DELAY (g) Δ SIGNAL (h) $W_k$ UPDATE SIGNAL

UPCOUNT MODULO–(2L+2N)

FIG. 3

RAPID-UPDATE ADAPTIVE CHANNEL-EQUALIZATION FILTERING FOR DIGITAL RADIO RECEIVERS, SUCH AS HDTV RECEIVERS

The invention relates to adaptive filtering of the type used for equalization and for suppressing multipath signal effects in digital radio-wave receivers, particularly those receivers used for receiving digital television signals.

BACKGROUND OF THE INVENTION

Digital television transmission commonly relies heavily on powerful image compression techniques being used, to reduce the number of digital symbols that must be transmitted in order to describe sequential moving images. Forward error-correction coding is performed on the digital signals, primarily to combat impulse noise or burst noise. Until the bit-error rate (BER) becomes too great for correction responsive to the forward error-correction coding, the images regenerated from the received digital signals will exhibit little or no discernible deterioration. When the BER exceeds the capability of the error-correcting coding, there is a catastrophic failure in the capability to reconstruct the transmitted image, so the TV receiver cannot reproduce new picture information. Arrangements can be made to present on the viewing screen a frozen picture, corresponding to the last television image satisfactorily received or to an extrapolation from the last few television images satisfactorily received. There will be no audio accompanying the frozen picture.

Since the image regeneration process is essentially perfect until the BER overwhelms forward error-correction coding capability, and since there is virtually complete failure in the image regeneration process thereafter, it is difficult to characterize the visual effects of multipath or or other channel distortions on a digital television receiver. Accordingly, the effects of multipath distortion on a digital television receiver are normally characterized in terms of the rate of error in digital symbols before error correction is implemented. It is very desirable to compensate against multipath distortion, to the extent that it causes significant increase in the rate of error in digital symbols before error correction is implemented. This helps avoid the occurrence of failure in the image regeneration process caused by forward error-correction coding capability being overwhelmed.

The transmission channel in which multipath distortion arises can be characterized as a tapped-delay-line filter responding to the originally transmitted signal in accordance with a first transfer characteristic. The output port of this filter, which is in the digital radio receiver, is commonly assumed to be at the output port of the final detector for carrier modulation, prior to re-digitization of the detected signal. The effects of multipath distortion on the response of this filter can be compensated for at the digital receiver by passing the digitized response with multipath distortion through a channel-equalization filter having a second transfer characteristic that when multiplied by the first transfer characteristic generates a product that through a frequency band of interest has substantially uniform group delay and a substantially flat amplitude-versus-frequency characteristic. Since multipath distortion is liable to change from time to time within a transmission channel, and since the multipath distortion characteristics of different transmission channels differ in a radio receiver capable of selecting amongst different transmission channels, the channel-equalization filter is usually an adaptive filter, the filtering characteristics of which can be adjusted responsive to reception conditions.

Since the characteristics of a transmitted digital signal are known a priori, it is possible, at least in theory, to utilize such characteristics in a system of multipath detection and adaptive channel equalization. Various problems limit this approach to channel equalization, however. Accordingly, television engineers have found it desirable to transmit recurrently a training signal situated in a portion of the TV signal that is currently unused for video purposes and to utilize this training signal for the detection and characterization of multipath distortion prior to arranging for its suppression. Such a signal is herein referred to as a training signal; and a variety of different training or "ghost cancelation reference" signals have been described in patents and other technical publications. The strategy for eliminating multipath distortion relies on the transmitted training signal suffering the same multipath distortions as the rest of the television signal. A computer in the receiver can then examine the distorted training signal that is received and, with a priori knowledge of the distortion-free training signal, can calculate the characteristics of the transmission channel. The computer can then calculate the characteristics required of a filter that will respond to the received signal, but will suppress the effects of multipath signals.

In the digital television signals for broadcasting high-definition television (HDTV), each data field contains 313 data lines, and the fields are consecutively numbered modulo-two in order of their occurrence. Each line of data starts with a line synchronization code group of four symbols having successive values of +S, -S, -S and +S. The value +S is one level below the maximum positive data excursion, and the value -S is one level above the maximum negative data excursion. The lines of data are each of 77.3 microsecond duration, and there are 832 symbols per data line for a symbol rate of about 10 megabits/second. The initial line of each data field is a field synchronization code group that codes a training signal for channel-equalization and multipath signal suppression procedures. The training signal is a 511-sample pseudo-random sequence (or "PR-sequence") followed by three 63-sample PR sequences. This training signal is transmitted in accordance with a first logic convention in the first line of each odd-numbered data field and in accordance with a second logic convention in the first line of each even-numbered data field, the first and second logic conventions being one's complementary respective to each other. The reference sequence(s) can be analyzed, channel characterization determined and appropriate equalizing filter can be implemented. However, this process can be rather slow and is definitely not suitable for any multipath signal, such as some airplane flutter, that varies quite quickly with elapsed time.

Owing to the nature of the digital signal used in HDTV, the adaptation of the channel-equalization filter could be performed with every received symbol on a decision-directed basis (in the absence of the reference sequence). However, currently the limiting factor on the speed of initially equalizing the reception channel or of tracking a time-varying multipath is established by the processing speeds of the computing devices being utilized. Increasing the processing speeds of the computing devices will improve system performance until the point is reached at which all the computations and the subsequent updating of the filter coefficients can be realized with each newly received symbol or with a reasonably small group of newly received symbols.

Several methods of performing "adaptive equalization/multipath cancellation" are described in the literature. In simplest terms, the input signal is processed through an equalizer filter. The filter output, is "compared" to the desired output and based on a certain algorithm a correction to the filter parameters is computed and adapted to the filter. The process is continuously repeated until the equalized filter output is "correct", so multipath effects are attenuated sufficiently that they do not exceed levels prescribed as being "acceptable". To aid in developing an understanding of the nature of the computations involved, the reader is referred to the following publications, incorporated by reference:

G. A. Clark, S. K. Mitra, S. R. Parker, "Block implementation of adaptive digital filters," *IEEE Trans. ASSP*, pp. 744–752, Vol. 29, June 1981, and J. C. Lee and C. K. Un, "Performance Analysis of Frequency-Domain Block LMS Adaptive Digital Filters," *IEEE Trans. on Circuits and Systems*, pp. 173–189, Vol. 36, No. 2, Feb. 1989.

The basic adaptive equalization/multipath cancellation equations are known from the last-listed of these references to be:

$$y^n = \sum_{k=0}^{N-1} W_k^m \cdot X^{(n-k)}, \quad (1)$$

$k = 0, 1, \ldots, (N-1)$, and $mN \leq n < (m+1)N$ $$e^n = y^n - d^n \quad (2)$$

$$\Delta_k^m = \sum_{j=mN}^{[(m+1)N]-1} e^j \cdot X^{(j-k)} \quad (3)$$

$$W_k^{(m+1)} = W_k^m + \mu \cdot \Delta_k^m \quad (4)$$

This adaptation algorithm is based on a group of N symbols and not on each symbol. Such an algorithm is identified as "Block LMS". It is known to have the same performance as the well-known LMS (least mean squares) algorithm when the channel varying speed is slower than the realized convergence with the block of N symbols. (Superscripted terms in these equations are not terms raised to "powers" indicated by the superscript. Rather the superscripts following general terms are a set of further indices for sets of specific terms, the specific terms in each set being indexed by subscripts following general terms.) A channel-equalization filter with coefficients $W_k$ (the parameter m is not shown here since it only indicates the number of updates) and input data $x^n$ (ghosted and/or equalization needed) generates equalized data $y^n$ according to equation (1). Since the equalization indicated by equation (1) must be done in real-time, standard practice is to implement that equalization using an appropriate FIR filter. When equalization is done using a training signal, an IIR filter suppresses multipath responses that are delayed respective to strongest signal better than an FIR filter having the same number of taps. In decision-directed equalization, the computation of weighting coefficients for the channel-equalization filter is based strictly on some observation that does not depend on or indicate the time relationship of multipath signals. When the computation procedure begins without knowledge of suitable initial values of the weighting coefficients, the procedure is referred to as "blind" equalization. Because the response of an IIR filter is regenerative in nature, errors introduced by "blind" equalization tend to be perpetuated and will be rarely eliminated by continuing calculation. Presumably this is the reason that, until the invention described in this specification was made, decision-directed equalization had invariably been used only with FIR channel-equalization filters.

Until the invention described in this specification was made, the computation for the filter adaptation has been performed using a type of microprocessor commonly known as a "digital signal processor" or "DSP". For each sample data $y^n$, an estimate of error $e^n$ is computed from the known or expected (decision directed) value of $y^n$ according to equation (2). The error estimate and input data $x^n$ are used to compute the correction for the equalizing filter coefficients $W^k$ according to equation (3). Then the coefficients $W^k$ are updated using this correction. The parameter m in the equation (4) indicates the corrections sequence.

Since the amount of correction to the coefficients can be in error, depending upon the incoming data and on the estimated value of y, it is prudent to use only a fraction of the predicted correction in which case the convergence to the correct set of coefficients $W^k$ will be slow. However, if there was an error in prediction, its effect on the result will be minimal. It may be desired to compute and implement correction from every set of data. However, the rate of incoming data is about 10 megasymbols per second for the Grand Alliance system using vestigial sideband (VSB) transmission and is about 5 megasymbols per second for the General Instrument cable-HDTV system using quadrature-amplitude-modulation (QAM) transmission sometimes referred to as "complex amplitude modulation transmission". However, it should be pointed out that in case of QAM data $x^n$, $y^n$, etc. are complex, so the the term $x^{(j-k)}$ in equation (3) will be the complex conjugate, $x^{(j-k)*}$. Considering the speed of commercially available DSP microprocessors, computing and implementing correction from every set of data is impractical.

To implement this process using a training signal, it is a general practice to store the known training signal in a read-only memory (ROM) and to use a DSP (microprocessor) to compute $W^k$ and update the equalizing filter coefficients. Thus, the rate at which the equalization can be realized is based on the operating speed of the DSP and the processing time to compute the $W_k$. For example equation (3) takes N multiply-add operations per update (or about $2.5 \cdot 10^{12}$ multiply-add operations per update for N=256 and a data rate of 10 megasymbols/second). This is far beyond what a microprocessor can handle. As a matter of fact, even the fastest microprocessor limits the rate of equalizing filter coefficients update, since the training signal length and the amount of computations required are huge. Even the decision-directed computation is slow, since the time required to compute the correction is relatively large for the available DSP speed. This handicap directly reflects in the limitation of handling the time-varying multipaths.

SUMMARY OF THE INVENTION

In response to a received carrier wave modulated in accordance with a digital signal, a digital radio receiver recovers in digital form a modulating signal that is at times subject to undesirable amounts of multipath distortion. This recovered modulating signal is applied as respective input signals to first and second finite-impulse-response (FIR) filters, each of an N-tap type, the taps of which are adaptively weighted. The first FIR filter responds to the modulating signal to supply an output signal in which multipath distortion is suppressed. The second FIR filter responds to the modulating signal to generate corrections for the tap weights of the first FIR filter, which corrections are generated more rapidly than can be done with a microprocessor of the type commonly known as a "digital signal processor" or "DSP". A digital comparator compares samples of the first FIR filter response to corresponding samples of an ideal response, thereby to generate updated tap weights for the second FIR filter.

BRIEF DESCRIPTION OF THE DRAWING

FIG. 3 is a timing diagram of the sequence of operations in the FIG. 2 channel-equalization filter circuitry.

DETAILED DESCRIPTION

Figure 1:
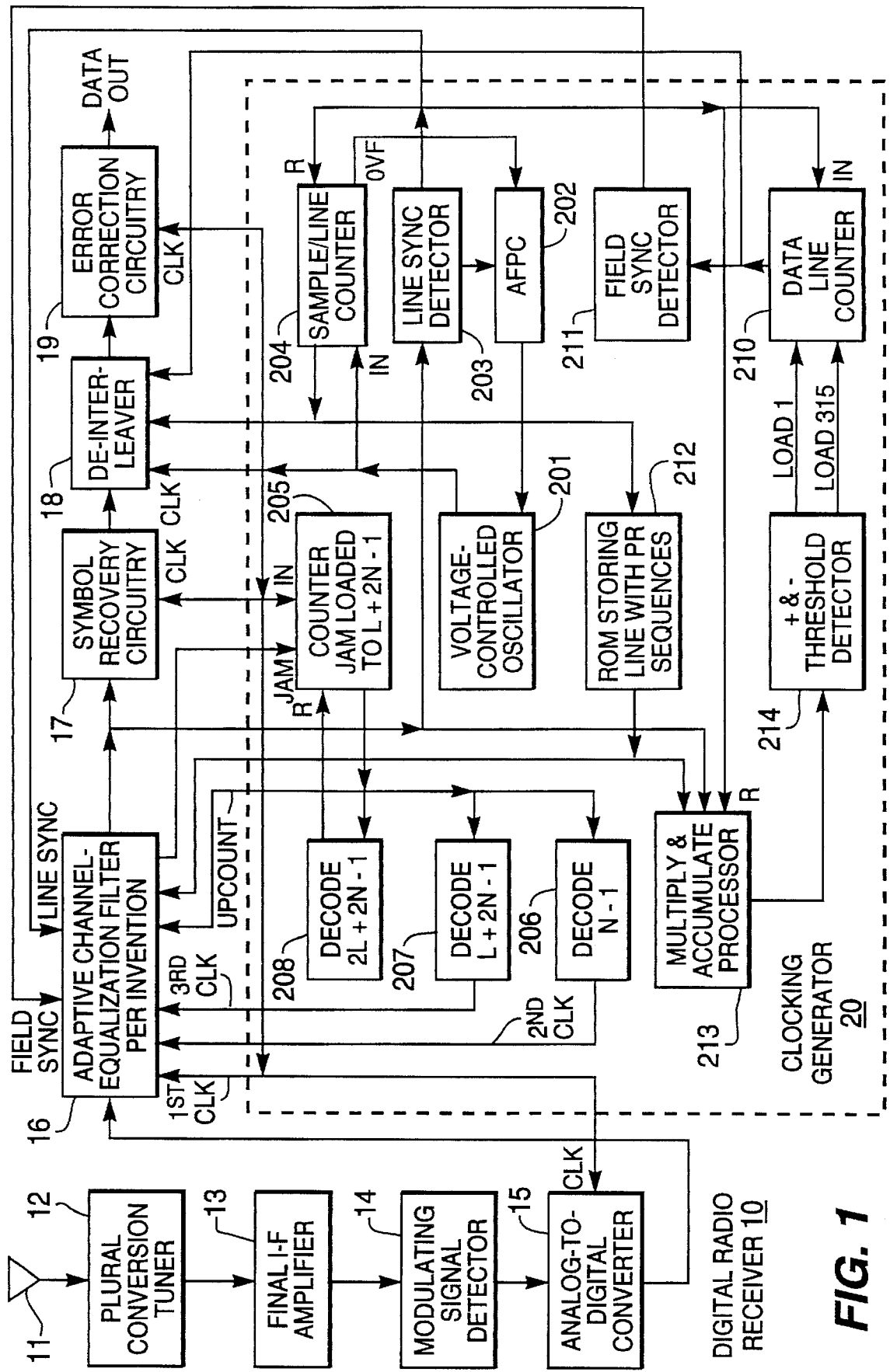
FIG. 1 is a schematic diagram of a digital radio receiver, as may be employed in a high-definition television set, which digital radio receiver includes an adaptive channel-equalization filter constructed in accordance with a first embodiment of the invention.

FIG. 1 shows a digital radio receiver 10 receiving radio frequency (R-F) signals transmitted over-the-air, reception being via a receiving antenna 11. Alternatively, the digital radio receiver 10 can receive R-F signals through a cablecast system, the exact nature by which the receiver 10 receives R-F signals not being a matter of direct concern to the invention. Over-the-air transmissions of high-definition television signals in the ultra-high-frequency (UHF) band are subject to multipath signals with rather long differential delay; so channel-equalization to correct for multipath signals with up to 20 microseconds differential transmission delay is commercially desirable, although most strong multipaths exhibit differential transmission delay of less than 5 microseconds. Multipath signals in cablecast high-definition television signals generally have shorter differential delays. Presuming sample rates of 10 megasamples per second, with each sample being about 100 in duration, a finite-impulse-response (FIR) digital filter will require at least 200 taps to correct for multipath signals with up to 20 microseconds differential delay. In the Grand Alliance system the symbol rate is about 10 megasymbols per second, and if sample rates are higher by a factor R, the FIR filter will require proportionately more taps. A 288-tap FIR filter will support an oversampling ratio R of 1.44, for example. The received R-F signals are supplied to a tuner 12, which supplies intermediate-frequency (I-F) signals to a final I-F amplifier 13. The amplified response of the final I-F amplifier 13 is supplied to a detector 14, which recovers a modulating signal in response to a received carrier wave modulated in accordance with a digital signal and converted to I-F by the tuner 12. This modulating signal is an analog signal encoding the digital signal.

The detector 14 may simply be an envelope detector; or, for better linearity, the detector 14 may be an exalted-carrier detector, a quasi-synchronous detector or a synchronous detector. Preferably, the tuner 12 is of a plural-conversion type using more than one intermediate-frequency (I-F) amplifier. Up-conversion of the received R-F signals (in a first detection step) to a few gigahertz first intermediate frequency is preferred for facilitating the construction of the surface-acoustic-wave (SAW) filter required for selecting a desired channel from its neighboring channels. Then, in one type of design for the tuner 12, the first I-F amplifier response is down-converted (in a second detection step) to the conventional 45 MHz intermediate frequency for amplification by a second I-F amplifier (13) and the second I-F amplifier response is detected by a third detector (14). Alternatively, in another type of design for the tuner 12, the first I-F amplifier response is down-converted to the conventional 45 MHz intermediate frequency for amplification by a second I-F amplifier, then down-converted a second time (in a third detection step) for amplification by a third I-F amplifier (13) and the third I-F amplifier response is detected by a fourth detector (14). The invention can be used with these and other types of detection arrangement, including those arrangements using autodyne or homodyne types of final conversion, and including those arrangements in which an analog-to-digital converter is supplied I-F amplifier response directly and the detector 14 is dispensed with.

In the detection arrangement shown in FIG. 1, the analog modulating signal recovered by the detector 14 is digitized by an analog-to-digital converter 15 for application as digital input signal to an adaptive channel-equalization filter 16 that is constructed in accordance with the invention. It is pointed out that this digital input signal is descriptive of the digital signal modulating the received carrier wave, but in most digital transmission schemes is not the same as the digital signal modulating the received carrier wave. The adaptive channel-equalization filter 16 includes, as a component thereof, an N-tap first FIR filter having adjustable tap weights and responding to the digital input signal supplied to filter 16 to generate a response supplied as the output signal from filter 16. In accordance with the invention, the adaptive channel-equalization filter 16 also includes, as a component thereof, an N-tap second FIR filter having adjustable tap weights, which is used in calculating adjustments of the tap weights of the first FIR filter. The output signal from filter 16 is supplied as digital input signal to symbol recovery circuitry 17, which can be one of the types known generally in the art. The symbol recovery circuitry 17 reproduces, subject to error, the digital information in the digital signal modulating the received carrier wave. The data format of the digital information supplied from the apparatus 17 may conform to that of the digital signal modulating the received carrier wave in some systems, or its data format may be different.

Typically, the digital information supplied from the symbol recovery circuitry 17 is a symbol stream in interleaved form and is accordingly supplied as input signal to a de-interleaver 18. The de-interleaved symbol stream from the de-interleaver 18 is supplied to error-correcting circuitry 19, which corrects errors in the symbol stream responsive to error-correcting codes contained in the symbol stream. The error-correcting circuitry 19 supplies a non-redundant symbol stream as its output signal. This non-redundant symbol stream reproduces the digital information originally supplied for transmission, so long as the error rate in the redundant symbol stream that circuitry 19 receives as input signal does not overwhelm the error-correcting capabilities of the error-correcting codes in that signal. In a high-definition television set the digital data supplied from the error-correcting circuitry 19 is supplied to those portions of the set which separate packets of data, in accordance with header coding in each packet, for application to the video signal reconstruction circuitry and for application to the audio signal reconstruction circuitry.

A clocking generator 20 is a necessary part of the digital radio receiver 10. The clocking generator 20 of FIG. 1 includes a voltage-controlled oscillator 201 that supplies a first clock signal, referred to as a "sample clock", to the elements 15–19 for timing the passage of digital samples through their cascade connections with each other. This first clock signal is generated at a rate referred to in this specification as the "first clocking frequency" which it is convenient to make an integral-power-of-two multiple of the symbol clock rate. Automatic-frequency-and-phase-control (AFPC) circuitry 202 supplies control signal for the VCO 201. A line synchronization detector 203 detects each occurrence of the data line synchronization code group of four symbols having successive values of +S, −S, −S and +S in the response of the channel-equalization filter 16. A LINE-SYNC pulse is generated 15 responsive to the occurrence of each such code group, and these LINESYNC pulses are supplied as input signal to automatic-frequency-and-phase-control circuitry 202. In a frequency-division operation that generates an AFPC feedback signal for application to the AFPC circuitry 202, a sample-per-line counter 204 counts the number of cycles of the first clocking frequency supplied from the VCO 201 and generates an overflow pulse each time the count reaches the number of samples that should occur in a data line. The AFPC circuitry 202 comprises a pulse discriminator for comparing the overflow pulses with the pulses detected by the data line synchronization detector 203 and an AFPC filter for low-pass filtering the pulse discriminator output signal, the AFPC filter response being applied to the VCO 201 as an error signal to close the AFPC loop.

There is also circuitry, not explicitly shown in FIG. 1, that, each time AFPC loop phase lock is re-established, is used to make minor phase adjustments of the first clock signal supplied from the VCO 201 to the analog-to-digital converter 15. This circuitry adjusts the sampling done during digitization, so it is in best temporal alignment for minimizing inter-symbol error. A control signal for this circuitry and an automatic-gain-control (AGC) signal for adjusting the gain in the final IF amplifier 13 can be developed by suitable detection circuitry in the symbol recovery circuitry 17.

The clocking generator 20 of FIG. 1 further includes a counter 205 that cyclically counts transitions in the first clock signal to generate an UPCOUNT signal, which is supplied to the adaptive channel-equalization filter 16. A decoder 206 responds to the UPCOUNT signal reaching a value of N−1 for generating a second clock signal. A decoder 207 responds to the UPCOUNT signal reaching L+2N−1 value for generating a third clock signal. A decoder 208 responds to the UPCOUNT signal reaching 2 L+2N−1 value to force the next count of the counter 205 to be zero. Accordingly, the second and third clock signals are generated at different phasings of a second clocking frequency that is the $(2\ L+2N)^{th}$ submultiple of the first clocking frequency. As will be appreciated by one familiar with the design of digital circuitry, the first, second and third clock signals are supplied as single-phase or plural-phase pulse signals in various designs for clock generator 20.

The more significant bits of a SAMPLE-PER-LINE-COUNT from the counter 204 provide a SYMBOL-PER-LINE-COUNT. The overflow pulses from the sample-per-line counter 204 (or, alternatively, the LINESYNC pulses from the line sync detector 203) are counted by a data line counter 210, which counts up to 628 and then rolls over to unity initial count to generate a DATA-LINE-COUNT. The DATA-LINE-COUNT is supplied as input signal to the field sync detector 211, which includes decoding circuitry for detecting when the DATA-LINE-COUNT is unity or 315 to generate the FIELDSYNC pulses. The SYMBOL-PER-LINE-COUNT and the DATA-LINE-COUNT are supplied to the de-interleaver 18 to be used in addressing random-access memory (RAM) contained therein. It is most convenient, but not necessary, that the data line counter 210 use arithmetic in which the most significant bit is the modulo-2 DATA-FIELD-COUNT and the less significant bits count the lines per field. This simplifies design of the de-interleaver 18.

The DATA-LINE-COUNT generated by the counter 210 in the digital radio receiver 10 has to be synchronized to the data in the received transmissions. The counter 210 is designed to respond to a first reset signal to jamload zero count into its counter stages and to a second reset signal to jamload 314 count into its counter stages. The SAMPLE-PER-LINE-COUNT from the counter 204 is applied as addressing to a read-only memory 212 which stores a data line including the consecutive PR sequences located per the first line of data in each even-numbered field (line 315 in the data frame). This line of data is recurrently read from the ROM 212 to a multiply-and-accumulate processor 213 as a multiplicand input signal thereto. The processor 213 receives as a multiplier input signal the channel-equalization filter 16 response. The processor 213 accumulates multiplication products in order to generate an accumulated output signal for application to a dual-threshold detector 214. The result of the accumulation is reset to zero at the beginning of each data line, responsive to a LINESYNC pulse supplied to the processor 213 from the line sync detector 203. The accumulated output signal from the processor 213 will be small in amplitude for most lines of data, since they will not be strongly correlated or strongly anti-correlated with the line of data recurrently read from the ROM 212. The initial data line of an even-numbered field strongly correlates with the line of data recurrently read from the ROM 212, to cause a positive-polarity accumulated output signal from the processor 213, which signal is of large enough amplitude to rise above a positive threshold value in the dual-threshold detector 214. The dual-threshold detector 214 responds to this positive threshold value being risen above to supply a first reset signal to the counter 210 to cause 263 count to be jamloaded into its counter stages. The initial data line of an odd-numbered field strongly anti-correlates with the line of data recurrently read from the ROM 212, to cause a negative-polarity accumulated output signal from the processor 213, which signal is of large enough amplitude to fall below a negative threshold value in the dual-threshold detector 214. The dual-threshold detector 214 responds to this negative threshold value being fallen below to supply first reset signal to the counter 210 to cause zero count to be jamloaded into its counter stages.

Figure 2:
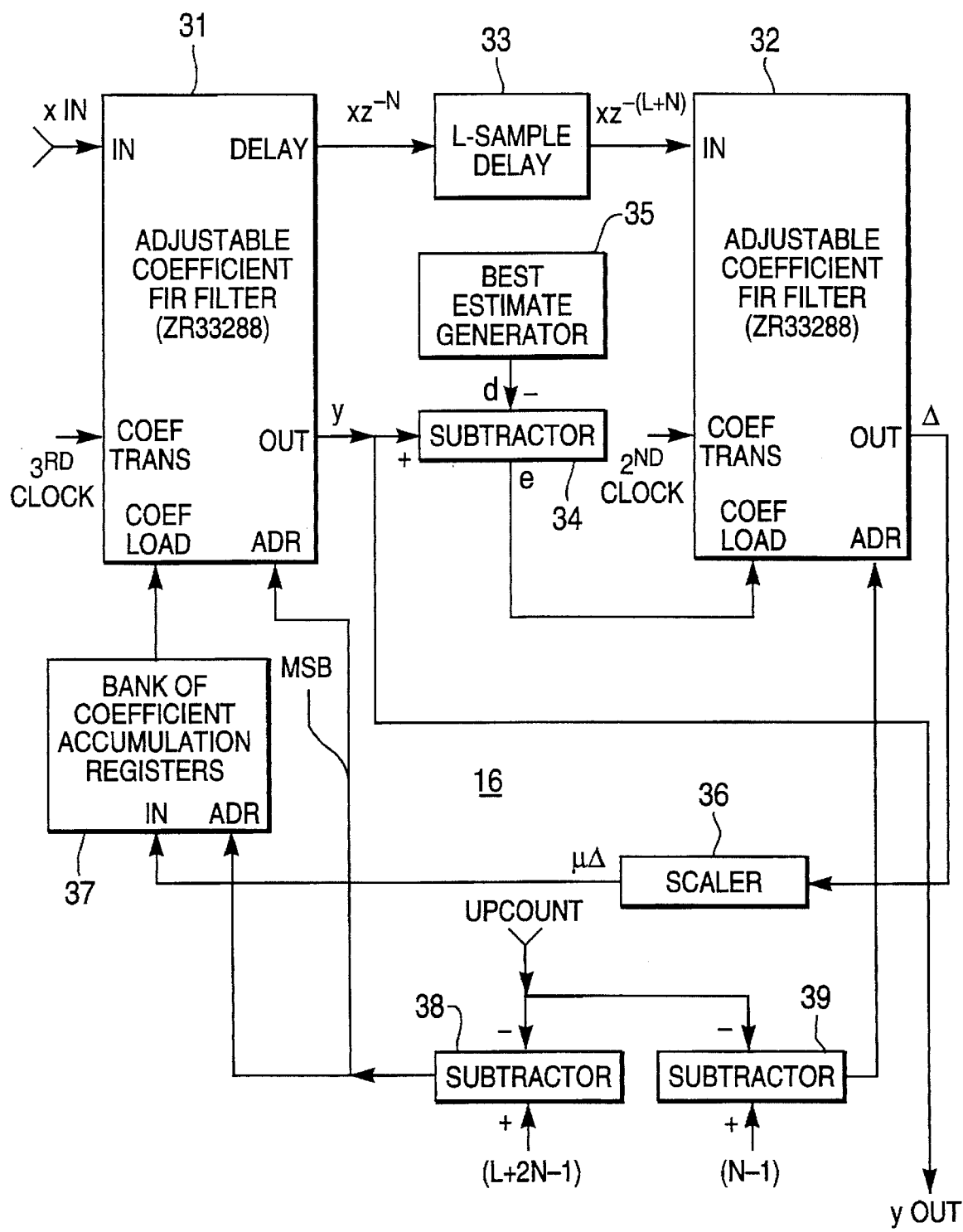
FIG. 2 is a schematic diagram of an adaptive channel-equalization filter constructed, in accordance with the first embodiment of the invention, from first and second video-rate digital filters.

The FIG. 2 schematic diagram shows a general structure for the channel-equalization filter 16, which is an embodiment of the invention preferred in that the first FIR filter 31 and the second FIR filter 32 therein can be off-the-shelf video-rate digital filters, such as 288-tap ZR33288 video-rate digital filters manufactured by ZORAN Corporation of Santa Clara, Calif. FIG. 3 is a timing diagram of the sequence of operations in the channel-equalization filter structure of FIG. 2 during normal operation, which takes place after an initialization operation has been completed. The mensuration of the time abscissa is done on a modulo-(2 L+2N) basis in accordance with the condition of the UPCOUNT from the counter 205.

The filters 31 and 32 are described more generally in this specification as being N-tap filters. Direct connection from the analog-to-digital converter 15 continually applies digital samples of the modulating signal to the input port of the first FIR filter 31. The first FIR filter 31 is depicted in detail in FIG. 4 as being of direct-form structure including therewithin an N-tap delay line 311, a weighted summer 312, a bank 313 of N digital registers, a digital adder 314, a post-processing register 315 and another bank 316 of N digital registers.

(The reader is referred to pages 188 and 189 of the text *Digital Signal Processing Theory, Applications and Hardware* by R. A. Haddad and T. W. Parsons published in 1991 by Computer Science Press and printed by W. H. Freeman and Company of New York, N.Y., and Oxford, England. These pages contrast the direct-form structure for an FIR filter, in which an input signal is differentially delayed before weighted summation to generate filter output signal, with the transposed-direct-form structure in which the input signal has the various weights applied thereto and the delays occur during summation of the weighted input signals to generate a filter output signal. The direct-form FIR filter structure and the transposed-direct-form FIR filter structure are referred to as the canonical FIR filter structure and inverse-canonical FIR filter structure by other writers.) Per FIG. 3 waveform (h), for the purpose of being written by $W_k+\mu\Delta$ samples to update filter 31 filtering coefficients, the bank 316 of "shadow" coefficient registers are sequentially addressed by addresses ascending from zero to (N−1) during the time the UPCOUNT from the counter 205 of FIG. 1 progresses from (L+N) count to (L+2N−1) count. After the (L+2N−1) count the coder 207 of FIG. 1 generates the third clock signal, as shown in FIG. 3 waveform (a). This third clock signal is applied to the filter 31 as a coefficient transfer command, causing the respective contents of the bank 316 of "shadow" coefficient registers to be transferred in parallel to corresponding registers in the bank 313 of "working" coefficient registers for supplying the weights used in the weighted summer 312. The final tap of the delay line 311 is available at a pin of the filter 31 and provides a response $x^*z^{-N}$ to an input signal x applied to the the input of the delay line 311 N sample clocks earlier. This delayed response $x^*z^{-N}$ is delayed an additional L samples in a delay line 33 to generate a further delayed response $x^*z^{-(L+N)}$ which FIG. 2 shows applied as input signal to the second FIR filter 32. The delay line 33 is preferably a clocked digital delay line.

Figure 4:
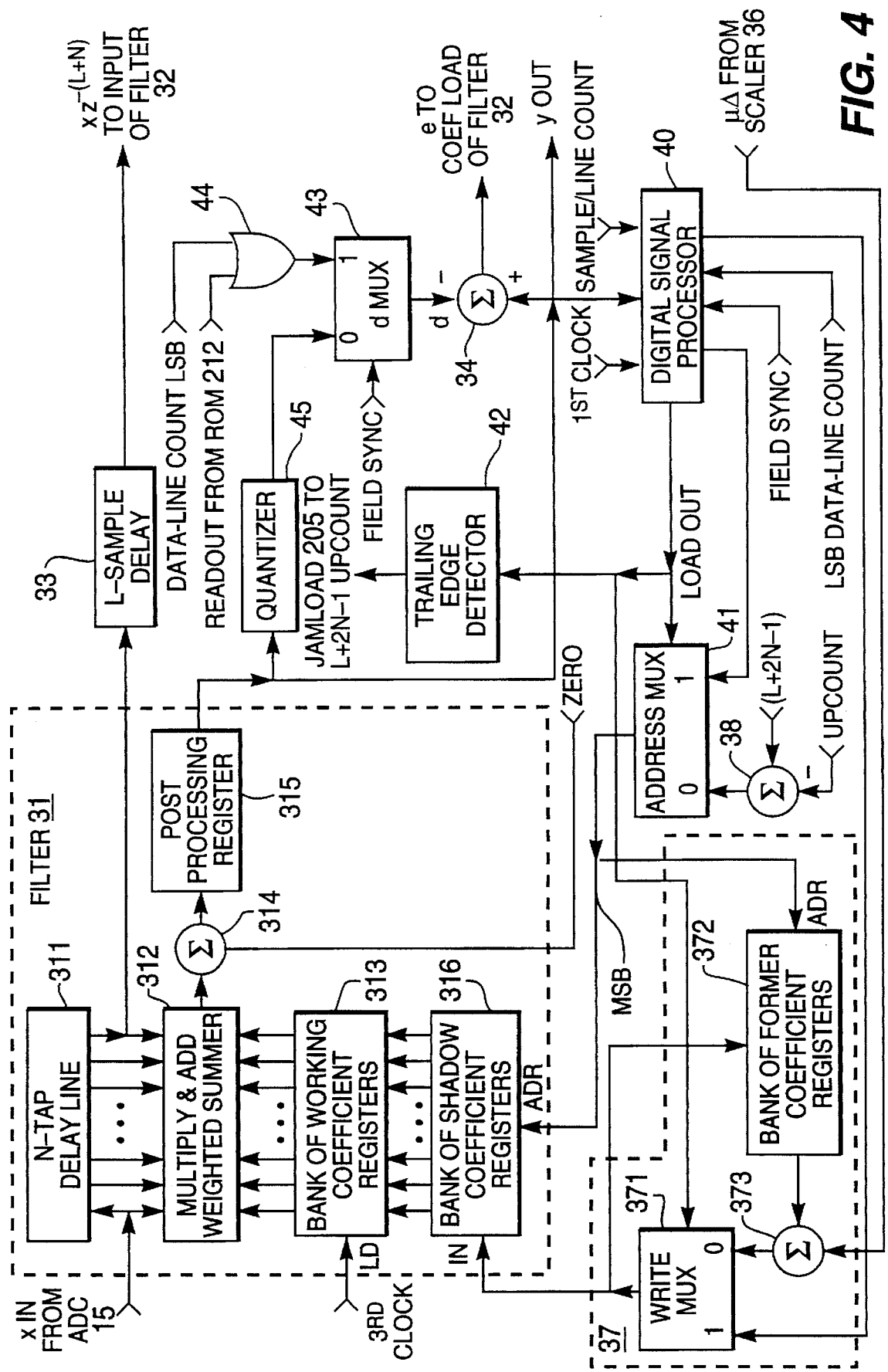
FIG. 4 is a more detailed schematic diagram of the portion of the FIG. 2 adaptive channel-equalization filter including the first video-rate digital filter.
Figure 5:
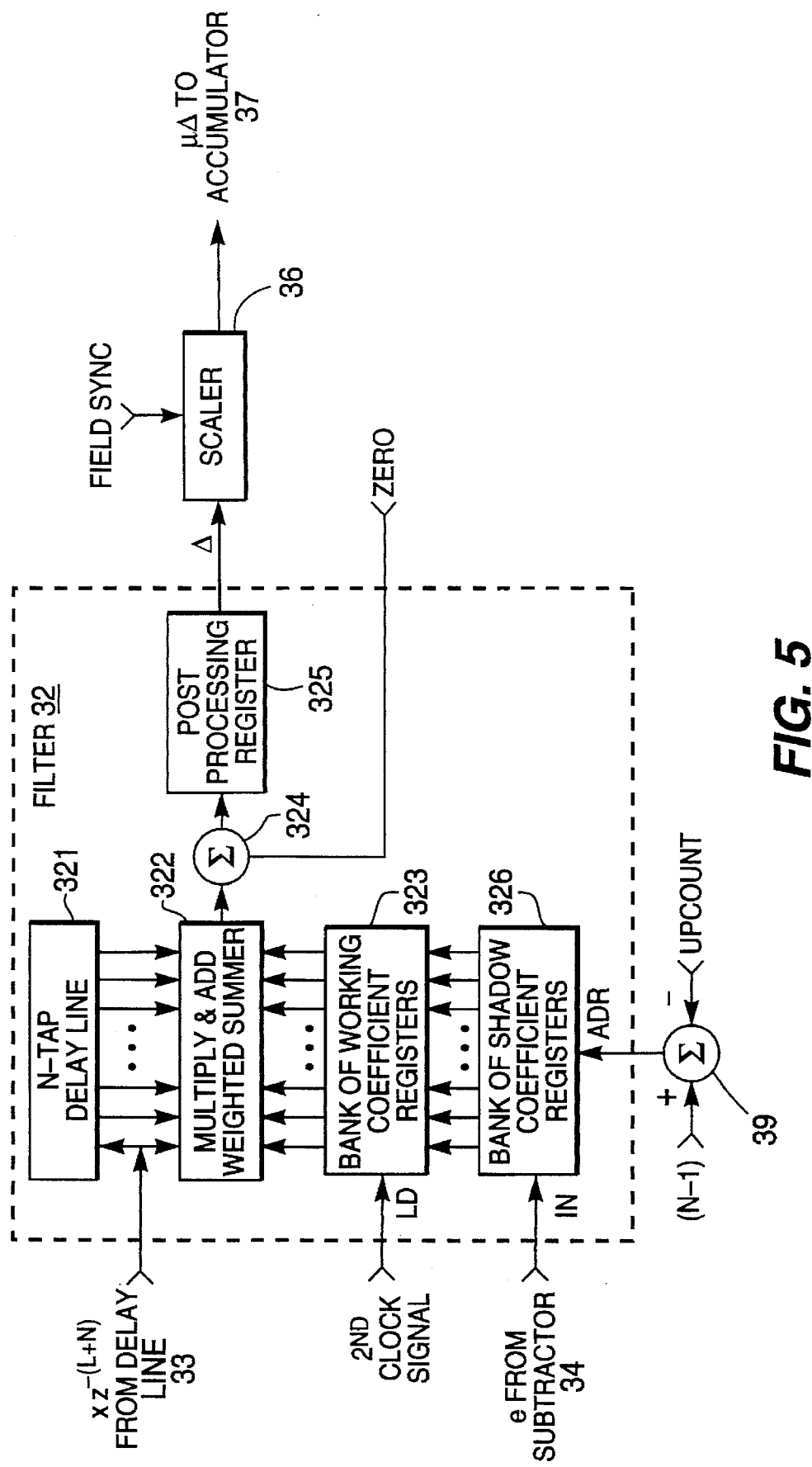
FIG. 5 is a more detailed schematic diagram of the portion of the FIG. 2 adaptive channel-equalization filter including the second video-rate digital filter.

The structure and internal operations of the second FIR filter 32 depicted in detail in FIG. 5 resemble those of the first FIR filter 31. The filter 32 is of direct-form structure and includes therewithin an N-tap delay line 321, a weighted summer 322, a bank 323 of N digital registers, a digital adder 324, a post-processing register 325 and another bank 326 of N digital registers. By way of example, each of the N-tap delay lines 311 and in FIG. 4 and 321 in FIG. 5 can be implemented as a multiple-parallel-bit, (N−1)-stage shift register, the ZR33288 video-rate digital filters using 8-parallel-bit N-tap delay lines. To implement the bank 326 of "shadow" coefficient registers being written by e update signal samples per FIG. 3 waveform (d), in order to update filter 31 filtering coefficients, the bank 326 of "shadow" coefficient registers are sequentially addressed by addresses descending from (N−1) to zero during the time the UPCOUNT from the counter 205 of FIG. 1 progresses from zero count to (N−1) count. After the (N−1) count the coder 206 of FIG. 1 generates the second clock signal, as shown in FIG. 3 waveform (e). This second clock signal is applied to the filter 32 as a coefficient transfer command, causing the respective contents of the bank 326 of "shadow" coefficient registers to be transferred in parallel to corresponding registers in the bank 323 of "working" coefficient registers for supplying the weights used in the weighted summer 322. The bank 326 of "shadow" coefficient registers provides means for temporarily storing the next-update tap weights for the second FIR filter 32 during each period during which those next-update tap weights are sequentially generated and thereafter applying those next-update tap weights to respective ones of the bank 323 of "working" coefficient registers as updated tap weights thereby implementing one of the periodic updates of the N-tap second FIR filter 32 tap weights.

After there is a change in its filter coefficients, each of the FIR filters 31 and 32 exhibits a lag of L sample periods before a response appears in which the new coefficients have been applied. This lag is caused by propagation delays through the digital adders and post-processing register of the filter. In the ZR33288 this lag is eight sample periods. These lags in the responses of the FIR filters 31 and 32 to updating of their filter coefficients require that there be appropriate compensating delays in the filter 16 circuitry, so that data and the filter coefficients are in proper time alignment in both the filters 31 and 32. The $z^{-(L+N)}$ delay provided by the delay lines 311 and 33 is such a compensating delay, being used to delay samples of input signal x to the filter 31 that are used by the filter 31 in performing the calculations of its response y per equation (1) so those same samples can subsequently be used by the filter 32 in performing the calculations of its response $\Delta$ by a procedure that provides the same results as would be provided performing calculations per equation (3). The same block of x samples shown in FIG. 3 waveform (b) that gives rise in the filter 31 response to the block of y samples shown in FIG. 3 waveform (c) is delayed as shown in FIG. 3 waveform (f) to provide input signal $x^*z^{-(L+N)}$, which gives rise in the filter 32 response to the block of Δ samples shown in FIG. 3 waveform (g). The calculations per equation (2) are implemented by a digital subtractor 34, which subtracts from the response y a best estimate d of true value supplied from a best estimate generator as shown in FIG. 2, thereby to generate updated filter coefficients e for the filter 32. The response y is delayed L sample times after each parallel update of the "working" filter coefficients in the filter 31 that takes place, to clear the weighted summer 312 of samples generated by the previous filter coefficients, as is shown in FIG. 3 waveform (c). Then, per FIG. 3 waveform (d), the sequential loading of e coefficients into the bank 326 of shadow coefficient registers in filter 32 takes an additional N sample times before the filter 32 can transfer updated filter coefficients to its bank 323 of working coefficient registers, responsive to the second clock signal of FIG. 3 waveform (e), and begin to generate Δ samples to be used in updating the bank 316 of shadow coefficient registers in filter 31. These Δ samples appear from the filter 32 after a latency period of L samples, being supplied as shown in FIG. 3 waveform (g) during the time the UPCOUNT from the counter 205 of FIG. 1 progresses from (L+N) count to (L+2N−1) count.

A scaler 36 supplies fractions of the Δ samples as μΔ samples to a bank 37 of coefficient accumulation registers that perform the equation (4) calculations during the time the UPCOUNT from the counter 205 of FIG. 1 progresses from (L+N) count to (L+2N−1) count. Per FIG. 3 waveform (h), the resulting $W_k+\mu\Delta$ samples are written into the bank 316 of "shadow" coefficient registers as they are sequentially generated by the bank 37 of coefficient accumulation registers. The UPCOUNT from the counter 205 of FIG. 1 is supplied as subtrahend input signal to a digital subtractor 38 in FIG. 2, to be subtracted from a minuend input signal (L+2N−1) to generate a difference signal used to selectively address registers in the bank 37 of coefficient accumulation registers. This difference signal decrements from (N−1) to zero as the UPCOUNT from the counter 205 of FIG. 1 progresses from (L+N) count to (L+2N−1) count. The sign bit of this difference signal is removed and the remaining less significant bits are applied to the bank 316 of "shadow" coefficient registers as the sequential addresses deccending from (N−1) to zero during the time the UPCOUNT from the counter 205 of FIG. 1 progresses from (L+N) count to (L+2N−1) count. The address decoder in the bank 37 of coefficient accumulation registers selects registers for updating and then reading responsive only to UPCOUNTs in the range (L+N) to (L+2N−1), inclusive. Accordingly, corresponding registers in the bank 37 of coefficent accumulation registers and in the bank 316 of "shadow" coefficient registers are selected in parallel. The bank 37 of coefficient accumulation registers provides a means for temporarily storing the tap weights of said first FIR filter and accumulating corrections thereto as they are generated; and the bank 316 of "shadow" coefficient registers provides a means for thereafter transferring the corrected tap weights for the first FIR filter in parallel to its bank 313 of "working" coefficient registers, for implementing one of the periodic updates of the first FIR filter tap weights.

The UPCOUNT from the counter 205 of FIG. 1 is supplied as subtrahend input signal to a digital subtractor 39 in FIG. 2, to be subtracted from a minuend input signal (N−1) thereby to generate a difference signal. The sign bit of this difference signal is removed and the remaining less significant bits are applied to the bank 326 of "shadow" coefficient registers as the sequential addresses descending from (N−1) to zero during the time the UPCOUNT from the counter 205 of FIG. 1 progresses from zero count to (N−1) count. The sequential addressing of the bank 326 of "shadow" coefficient registers of filter 32 being in reversed order compared to the sequential addressing of the bank 316 of "shadow" coefficient registers of filter 31 should be noted. Equation (1) implemented by filter 31 is already of a form suited for implementation by the convolutional processing of an FIR filter, since as the index k of the summation increments, the index (n−k) of the x terms decrements, placing the samples further back in time. Equation (3) is not of a form suited for implementation by the convolutional processing of an FIR filter, since as the index j of the summation increments, the index (j−k) of the x terms also increments, advancing the samples in time. In alternative embodiments of the invention arrangements could be made to store x samples in memory, so they could be read in reverse time sequence to an FIR filter that has a kernel of e terms in which the index j increases for samples further back in time in accordance with equation (3). The corrections to the weighting coefficients of the first FIR filter 31 would then be generated in order of the addressing, incrementing from 0 to N−1.

Rather than applying digital samples of the modulating signal to the input port of the second FIR filter 32 in reverse time sequence, in the preferred embodiment of the invention shown in FIG. 2, an equivalent calculation is performed by the second FIR filter 32 in which the kernel of the FIR filter is reversed so that the x terms can be supplied to the filter in normal time order. That is, the FIR filter 32 is arranged to have a kernel of e terms in which the index j decreases for samples further back in time. This permits more of a pipeline flow to the calculations, so that the means for applying digital samples of the modulating signal to the input port of the second FIR filter 32 can be simply provided by delay. Delay through the delay line 311 can be utilized to provide most of the storage required to locate the x input samples properly in time for implementing the calculations of $\Delta_k$ samples. The calculations actually carried out by the filter 32 are, then, of the type described by equation (5), below.

$$\Delta_k^m = \sum_{j=0}^{N-1} e^{(mN+N-1-j)} \cdot X^{(mN+N-1-k-j)} \tag{5}$$

Equation (5) is of a form suited for implementation by the convolutional processing of an FIR filter. This can be discerned by re-writing equation (5), applying the following definitions.

$$e^{(mN+N-1-j)} = \epsilon_j^m \text{ for } 0 \leq j < N \tag{6}$$
$$\Delta_{(N-1-k)}^m = D_k \text{ for } 0 \leq k < N$$

$$-D_k^m = \sum_{j=0}^{N-1} \epsilon_j^m \cdot X^{(mN+k-j)}$$

In equation (6), obtained by re-writing equation (5), $D_k^m$ is the "output of x" filtered by $\epsilon_j^{m''}$.

FIG. 4 shows details of connections of the filter 31 that provide for more rapid adjustment of its filter coefficients during initialization operation just after the digital radio receiver is energized or during re-initialization operation just after its tuning has been changed. A digital signal processor 40 calculates the filter coefficients for the first FIR filter 31, substantially as is done in prior art practice, before the rapid-update circuitry of the invention takes over the further adjustment of those filter coefficients. It is advantageous, though not necessary, to use such a microprocessor 40, first to calculate the discrete Fourier transform of the transmission channel, and then to calculate the complement of that DFT, the terms of which complementary DFT are applied to the first FIR filter 31 as its initial filter coefficients. The digital signal processor 40 provides faster initialization than iterative calculation methods. The circuitry for determining when the digital radio receiver is first turned on or has been re-tuned, thereby to generate a start signal for the program sequencer in the DSP 40 is conventional and is not explicitly shown in the drawing. The start signal conditions the DSP 40 to load an initial set of filter coefficients into the filter 31 that condition it to have a flat frequency response with a delay of L+(N/2) samples. This loading is carried out by a procedure similar to that described presently for loading the filter 31 with the set of filter coefficients it is to have at the time the rapid-update circuitry of the invention takes over the further adjustment of those filter coefficients.

From the clocking generator 20 of FIG. 1, the DSP 40 is supplied first clocking signal generated by the VCO 201 and FIELDSYNC signal generated by the field sync detector 211. The DSP 40 can also be supplied SAMPLE-PER-LINE count from the counter 204 and the least significant bit of DATA-LINE-COUNT from the data line counter 210; or, alternatively, the DSP 40 is programmed to reproduce those counts from an internal counter of its own, proceeding from the first clocking signal and FIELDSYNC signal.

The DSP 40 has an input port connected for receiving the filter 31 output signal during times selected in accordance with the FIELDSYNC pulses supplied thereto by the field sync detector 211. The initial data lines of a number of fields are accumulated, each data line selected for accumulation being added to or subtracted from the previous accumulation result in accordance with the least significant bit of DATA-LINE-COUNT. The accumulation is preferably done over sixteen fields to generate a line of averaged data containing two consecutive PR sequences that have reasonably good signal-to-noise ratio, but that are apt to contain ghosts. The DSP 40 calculates the DFT of this line of averaged data and then divides it term-by-term by the DFT of that line of averaged data were it free of ghosts, as known a priori and stored in read-only memory associated with the DSP 40. The result of this term-by-term division is the DFT of the transmission channel. The DSP 40 subsequently calculates the inverse DFT of the transmission channel and supplies its terms to be used as filter coefficients for the filter 31. The DSP 40 supplies these filtering coefficient terms sequentially to a first input port of a write multiplexer 371 in the bank 37 of coefficient accumulation registers. The DSP 40 also calculates a respective RAMADDRESS address signal to accompany each filtering coefficient term, which respective RAMADDRESS address signal is supplied to a first input port of an address multiplexer 41. During the time that the DSP 40 is supplying the filter coefficient terms and their respective RAMADDRESS address signals, a LOADOUT signal that the DSP 40 supplies is logic ONE; at other times the LOADOUT signal is logic zero.

The LOADOUT signal is applied to the address multiplexer 41 as its control signal and, being a ONE, conditions the address multiplexer 41 to reproduce, as an extended address supplied as its output signal, the RAMADDRESS signal received at its first input port from the DSP 40. The extended address at the output of the address multiplexer 41 is applied to a bank 372 of "former" coefficient registers. If the extended address is a "valid" address, which is the case when it corresponds to a RAMADDRESS signal from the DSP 40, one of the bank 372 of "former" coefficient registers is selected for reading and subsequent rewriting. If the extended address is an "invalid" address outside the range of permissible addresses, none of the bank 372 of "former" coefficient registers is selected for reading or writing. The bank 316 of shadow coefficient registers in the filter 31 receives portions of the extended address from the output of the address multiplexer 41, for selecting one of the shadow coefficient registers for writing. The bank 316 of shadow coefficient registers can be wired always to receive write enable signal, or the extended address can be decoded to provide write enable signal to the bank 316 of registers only if it is a "valid" address.

The LOADOUT signal is applied to the write multiplexer 371 as its control signal and, being a ONE, conditions the write multiplexer 371 to reproduce the filter coefficient terms received at its first input port from the DSP 40, which terms are sequentially supplied from the output port of the multiplexer 371 as write input signals to the bank 372 of "former" coefficient registers and to the bank 316 of "shadow" coefficient registers in the filter 31. During their writing the registers in the banks 316 and 372 are selected in accordance with addresses supplied as output signal from the address multiplexer 41. Pairs of corresponding registers in the banks 316 and 372 have the same address for being written by the output signal of the multiplexer 41. The filter coefficient terms from the DSP 40 reproduced in the output signal of the multiplexer 371 when its control signal is ONE are written as "shadow" filter coefficients into respective ones of the bank 316 of "shadow" coefficient registers and are also written as "former" filter coefficients into respective ones of the bank 372 of "former" coefficient registers. After this writing is done, the initialization (or re-initialization) procedure is completed.

Variations of this initialization (or re-initialization) procedure can be used in which the digital signal processor 40 uses an iterative approximation technique, rather than DFT calculations, in order to determine the filter coefficients for filter 31 before the rapid-update circuitry of the invention takes over the further adjustment of those filter coefficients. Arrangements where a memory stores expected channel-equalization filter coefficients for a channel, based on the channel-equalization filter coefficients calculated when the channel was last tuned to, can be used as well.

After the initialization (or re-initialization) procedure, the LOADOUT signal from the DSP 40 becomes logic ZERO. A trailing edge detector 42 (which is a falling edge detector, assuming the positive logic convention is followed wherein logic ONE is more positive than logic ZERO) detects this transition to generate a logic ONE pulse. This logic ONE pulse commands the jam loading of the counter 205 to an UPCOUNT of (L+2N−1), causing the decoder 207 to generate the third clock signal. The third clock signal is applied to the filter 31 as a coefficient transfer signal that directs the parallel transfer of the contents of "shadow" coefficient registers in the bank 316 into corresponding "working" coefficient registers in the bank 313. So the rapid-update circuitry of the invention takes over the further adjustment of filter coefficients without pause, beginning immediately after the DSP 40 completes the initialization (or re-initialization) procedure for determining the filter coefficients.

After the initialization (or re-initialization) procedure, the LOADOUT signal supplied from the DSP 40 as control signal to the address multiplexer 41, being logic ZERO, conditions the multiplexer 41 to reproduce at its output port the difference signal from the subtractor 39. Being logic ZERO, the LOADOUT signal also applied as control signal to the write multiplexer 371 conditions the multiplexer 371 to reproduce terms received at a second input port thereof from a digital adder 373 at its output port, for being written as "shadow" filter coefficients into respective ones of the bank 316 of "shadow" coefficient registers and for also being written as "former" filter coefficients into respective ones of the bank 372 of "former" coefficient registers. The bank 372 of "former" coefficient registers temporarily store the same $W_k$ coefficients in corresponding ones of the bank 316 of "shadow" coefficient registers do. Those $W_k$ coefficients temporarily stored in the bank 372 of "former" coefficient registers are read as a first summand input signal to the adder 373, for being augmented by $\mu\Delta_k$ terms supplied to the adder 373 as a second summand input signal, thereby to implement calculations per equation (4). The write multiplexer 371, the bank 372 of "former" coefficient registers, and the digital adder 373 of FIG. 4 together comprise one specific embodiment of the bank 37 of coefficient accumulation registers shown in FIG. 2. This embodiment provides for updating the $W_k$ coefficients by augmenting them with respective $\mu\Delta_k$ terms, after the initialization of those weighting coefficients for the filter 31. This adaptive correction of the $W_k$ coefficients is based on calculations carried out by the filter 32, as will be presently described.

Calculations in accordance with equation (1) have to be continually performed at the sampling rate, or first clocking frequency, in the N-tap filter 31 of FIG. 4. However, the filter coefficients of the N-tap filter 31 are updated at a less frequent rate. After the bank 316 of "shadow" coefficient registers is written one register at a time during each interval beginning at UPCOUNT=(L+N) and ending at UPCOUNT=(L+2N−1), as shown in waveform (h) of FIG. 3, updating of the bank 313 of "working" coefficient registers takes place responsive to a pulsing to ONE of the third clock signal shown in waveform (a) of FIG. 3. In this description the sequence of operations is considered only with respect to one N-sample-long block of the input signal x, shown in waveform (c) as beginning when the modulo-(2 L+2N) UPCOUNT is (L+2N) and ending when it is (−L+N−1). The output response y to this N-sample long block of input signal x begins to appear from the filter 31 L sample periods later, during an interval extending from UPCOUNT=0 to UPCOUNT=(N−1), inclusive, as shown in waveform (d) of FIG. 3.

Referring back to FIG. 4, the N-tap delay line 311 receives the input signal x at its input port and supplies N successively received samples of that input signal at its N output taps for parallel-in-time application to the weighted summer 312. The weighted summer 312 in effect multiplies each of these input signal samples by a respective "working" coefficient of filtering supplied from the bank 313 of digital registers and adds the resulting products to generate a weighted sum supplied as a first summand signal to the adder 314. The adder 314 is included in the ZR33288 to implement its being cascaded with another of its kind to increase the number of filter taps by N, which feature is presumed not to be required for implementing the channel-equalization filter 16. Accordingly, the adder 314 is presumed to be supplied a wired arithmetic zero as a second summand signal, causing the sum output signal supplied to the post-processing register 315 by the adder 314 to replicate its first summand signal. The post-processing register 315 supplies a y output signal for the channel-equalization filter 16 of FIG. 2 which, except for bit-place limitation, reproduces the weighted sum supplied from the weighted summer 312.

The output response y, which begins to appear at UPCOUNT=0, supplies a minuend input signal for the digital subtractor 34. The subtractor 34 receives a subtrahend input signal, which is a best estimate d of the true value of its minuend input signal, from the output port of a multiplexer 43. The subtractor 34 functions as a digital comparator for comparing the output response y to the best estimate d to generate an estimate of the error in the output response y owing to the filter coefficients of filter 31 not being such as to suppress multipath reception. The subtractor 34 generates a difference output signal e that is descriptive of the estimated error in the response y and that can be used together with the block of x samples from which the response y is generated to compute corrections for the $w_k$ coefficients. The multiplexer 43 is controlled by the FIELDSYNC signal generated by the field sync detector 211 in FIG. 1. In the preferred embodiment of the invention, the best estimate generator 35 of FIG. 2 comprises the ROM 212 of FIG. 1 and elements 43–45 of FIG. 4.

When the FIELDSYNC signal is ONE, indicative that the data line is the initial line in a field, the multiplexer 43 reproduces its first input signal as its output signal d. The first input signal to the multiplexer 43 is the response of an exclusive-OR gate 44. The XOR gate 44 receives the least significant bit of the DATA-LINE-COUNT as a first input signal thereto. The line of data recurrently read from the ROM 212, which includes pseudo-random (PR) sequences per the $315^{th}$ data line, is supplied to the XOR gate 44 as a second input signal thereto. During the initial line of odd-numbered fields, the XOR gate 44 complements the line of data read from the ROM 212, thereby to generate the signal d. During the initial line of even-numbered fields, the XOR gate 44 reproduces without change the line of data read from the ROM 212, thereby to generate the signal d.

When the FIELDSYNC signal is ZERO, indicative that the data line is not the initial line in a field, the multiplexer 43 reproduces its second input signal as its output signal d. The second input signal to the multiplexer 43 is supplied by a quantizer 45 for the y signal. This quantizer 45 quantizes the y signal to substantially the same levels as the symbol recovery circuitry 17 does—i.e., to ones of the 8-VSB levels in the Grand Alliance HDTV broadcast system—and, in fact, the quantizer 45 can be a component of the symbol recovery circuitry 17.

Difference output signal from the subtractor 34 supplies updated filter coefficients for the filter 32 during the period extending from UPCOUNT=0 through UPCOUNT=(N−1), inclusive, as shown in waveform (e) of FIG. 3. As shown in waveform (e) of FIG. 3, the third clock signal (which causes the working filter coefficients of the filter 32 to be updated) occurs after UPCOUNT=(N−1) is reached, just after the full set of N samples of the signal e has been generated. The input signal x from the analog-to-digital converter 15 has to be delayed (L+N) sample periods in order for its samples to be in proper temporal alignment with this complete set of N samples of the signal e. The input signal x from the analog-to-digital converter 15 is delayed by N sample periods in the N-tap delay line 311 within the filter 31 and is then delayed an additional L sample periods in the clocked delay line 33 to generate, for application to the filter 32, the appropriately delayed input signal shown in waveform (f) of FIG. 3. The clocked delay line 33 shown in FIG. 4 can simply consist of an L-stage shift register clocked by the first clock signal.

The signal e from the subtractor 34 shown in FIG. 4 is used for updating the filter coefficients of the FIR filter 32 shown in detail in FIG. 5. The bank 326 of N digital registers is written one register per sample period with the e coefficients supplied as difference output signal from the subtractor 34 during the interval extending from UPCOUNT=0 through UPCOUNT=(N−1), inclusive. The writing is done in an order determined by write addressing corresponding to the less significant bits of the difference output signal of the digital subtractor 39, which subtracts from a wired minuend of value (N−1) the UPCOUNT supplied by the counter 205 in the clocking generator 20 of FIG. 1. Responsive to the second clock signal, the respective contents of the "working" coefficient registers in the bank 323 of N digital registers of FIG. 5 are overwritten by updated coefficients loaded in parallel by reading from corresponding "shadow" coefficient registers in the bank 326 of N digital registers. As shown in waveform (e) of FIG. 3, this loading occurs just after UPCOUNT=(N−1) is reached. Any overwriting of the bank 326 of N digital registers after this loading procedure, during the time the UPCOUNT progresses from N to (2 L+2N−1), is of no concern to operation.

The input signal x from the analog-to-digital converter 15, as delayed by (L+N) sample times, is applied to the input port of the N-tap delay line 321 in the interval extending from UPCOUNT=(L+N) to UPCOUNT=(2 L+N−1), inclusive. The N-tap delay line 321 supplies N successively received samples of that input signal at its N output taps for parallel-in-time application to a weighted summer 322. The weighted summer 322 in effect multiplies each of these input signal samples by a respective "working" coefficient of filtering supplied from the bank 323 of digital registers and adds the resulting products to generate a weighted sum supplied as a first summand signal to the adder 324. The adder 324 is presumed to be supplied a wired arithmetic zero as a second summand signal, causing the sum output signal supplied to a post-processing register 325 by the adder 324 to replicate its first summand signal. The post-processing register 325 supplies an output signal $\Delta$ which, except for bit-place limitation, reproduces the weighted sum supplied from the weighted summer 322. This output signal $\Delta$ begins at UPCOUNT=(L+N) and finishes at UPCOUNT=(L+2N−1), (N−1) samples later, as shown in waveform (g) of FIG. 3.

The output signal $\Delta$ is scaled by the factor $\mu$ in the scaler 36 shown in FIG. 5. The factor $\mu$ preferably is a binary fraction so that the scaler 36 can simply be a bit-place shifter. The value of $\mu$ is selected based on the desired speed of convergence of the channel-equalization algorithm and the attendant noise trade-off. Typically, $\mu$ is of the order of $2^{-10}$ or so when there is no training signal supplied for channel-equalization purposes. In preferred embodiments of the invention the scaler 36 is an electrically controlled bit-place shifter, receiving the FIELDSYNC signal as a control signal, scaling $\Delta$ by a factor $\mu$ is of the order of $2^{-10}$ or so when FIELDSYNC signal is a logic ZERO indicating that the data line is one that does not contain a training signal supplied for channel-equalization purposes. When FIELDSYNC signal is a logic ONE during the first data line of each data field, indicating that there is training signal supplied for channel-equalization purposes, the electrically controlled bit-place shifter scales $\Delta$ by a larger factor $\mu$, thus to speed the convergence of the channel-equalization algorithm. This is feasible because the estimate d developed from the training signal is not apt to be much in error except under very noisy reception conditions. When the estimate d is developed by decision-directed methods, it is more apt to be in random error, and a smaller value of $\mu$ keeps such error from having as pronounced an effect upon a $W_k$ value. One skilled in the art will understand that some processing of the FIELDSYNC signal is necessary in developing the electrical control signal for the electrically controlled bit-place shifter in the scaler 36, which processing will include delay compensation for the (2 L+N)-sample delay of the filter 32 output signal respective to x, input signal.

The signal $\mu\Delta$ from the scaler 36 of FIG. 5 is supplied as the second summand input signal to the adder 373 in the accumulator 37 shown in FIG. 4. The values $\mu\Delta_k$ of this signal represent the adaptive corrections to be made to the corresponding $W_k$ filter coefficients. The contents of the bank 372 of N "former" coefficient registers are previously calculated $W_k$ coefficients, which replicate those of corresponding "working" coefficient registers in the bank 313 of digital registers in the filter 31 and are augmented by successive samples of the signal $\mu\Delta$ from the scaler 36 during the time the UPCOUNT from the counter 205 progresses from (L+N) to (L+2N−1). The adder 372 supplies a sum output signal $W_k+\mu\Delta_k$. The $W_k+\mu\Delta_k$ coefficients are written serially into respective ones of the bank 372 of "former" coefficient registers immediately after their reading, in a read-and-then-write-over operation, and are written serially into respective ones of the bank 316 of "shadow" coefficient registers in the filter 31. The banks 316 and 372 of coefficient registers are addressed during their writing by the less significant bits of the output signal of the address multiplexer 41 decrementing from (N−1) to zero. The output signal of the address multiplexer 41 so decrements while reproducing the difference signal from the subtractor 38 supplied in response to its subtrahend signal supplied by UPCOUNT from the counter 205 progressing from (L+N) to (L+2N−1). The more significant bits of the address multiplexer 41 output signal are such as to describe "valid" addresses for the bank 372 of "former" coefficient registers enabling their writing during this time that UPCOUNT is in the range from (L+N) to (L+2N−1), inclusive. Thereafter, as shown in FIG. 3 waveform (a), the decoder 207 generates the third clock signal. The third clock signal is applied to the filter 31 as a coefficient transfer signal that directs the parallel transfer of the contents of registers in the bank 316 into corresponding registers in the bank 313, completing the first updating of the contents of the bank 316 of "working" coefficient registers in the FIR filter 31. The next cycle of updating the contents of these registers begins L sample times later, when the decoder 208 resets the counter 205 to an UPCOUNT of zero, next after the UPCOUNT of (2 L+2N−1). Operation during this next updating is similar to that during the first updating.

In variations of the circuitry described above in which the DSP 40 is not used, during start-up after receiver energization or channel retuning calculations are based only on x samples having values known a priori—i.e., x samples occurring during field sync intervals and possibly line sync intervals as well. The scaler 36 is then operated with lower attenuation (i.e., larger $\mu$) to speed the start-up calculations of the channel-equalization filter coefficients.

Small variations of the circuits just described can be made in which the filters 31 and 32 are still ZR33288s or similar commercial types. By way of specific example, the subtractor 34 and the adder 372 may be clocked types, with their own bit-latches adding sample delay to the latencies of the filters 31 and 32, in which case the decoders 207 and 208 may decode slightly higher values of counter 205 count. In another example, the filtering kernel in the filters 31 and 32 may be shortened by eight samples or so, to avoid the need for the clocked delay 33.

The filters 31 and 32 can be constructed within the confines of one or more custom monolithic integrated circuits, rather than being constructed using off-the-shelf video-rate digital filters such as the ZR33288. In such custom designs, the weighted summer 312 can write directly to the subtractor 34, dispensing with elements 314 and 315; and the weighted summer 322 can write directly to the scaler 36, dispensing with elements 324 and 325. In such custom designs, the adder 372 can be supplied its second summand input by the previously calculated $W_k$ coefficients as temporarily stored in the bank 316 of "shadow" coefficient registers, rather than the bank 372 of "former" coefficient registers, so that the bank 372 of N "former" coefficient registers can be dispensed with. The correspondence of registers in the bank 326 of "shadow" coefficient registers and in the bank 313 of "working" coefficient registers can be reversed in the customized second FIR filter 32, so that the addressing of the "shadow" coefficient registers during their writing is ascending rather than descending in nature. It is very advantageous to accumulate the corrections to the first FIR filter 31 weighting coefficients sequentially, directly after they are generated, and to temporarily store the corrected first FIR filter weighting coefficients until their parallel transfer to the bank 313 of "working" coefficient registers. However, arrangements to temporarily store corrections for the first FIR filter weighting coefficients and to add the corrections to the previous contents of corresponding ones of the bank 313 of "working" coefficient registers during their parallel updating is possible. Custom designs are possible in which the temporary-storage banks 316 and 326 of registers with their random-access writing are replaced by banks of registers loaded by successive-shift operations; such alternative embodiments of the invention are considered to be obvious equivalents of the preferred embodiment described above.

Figure 6:
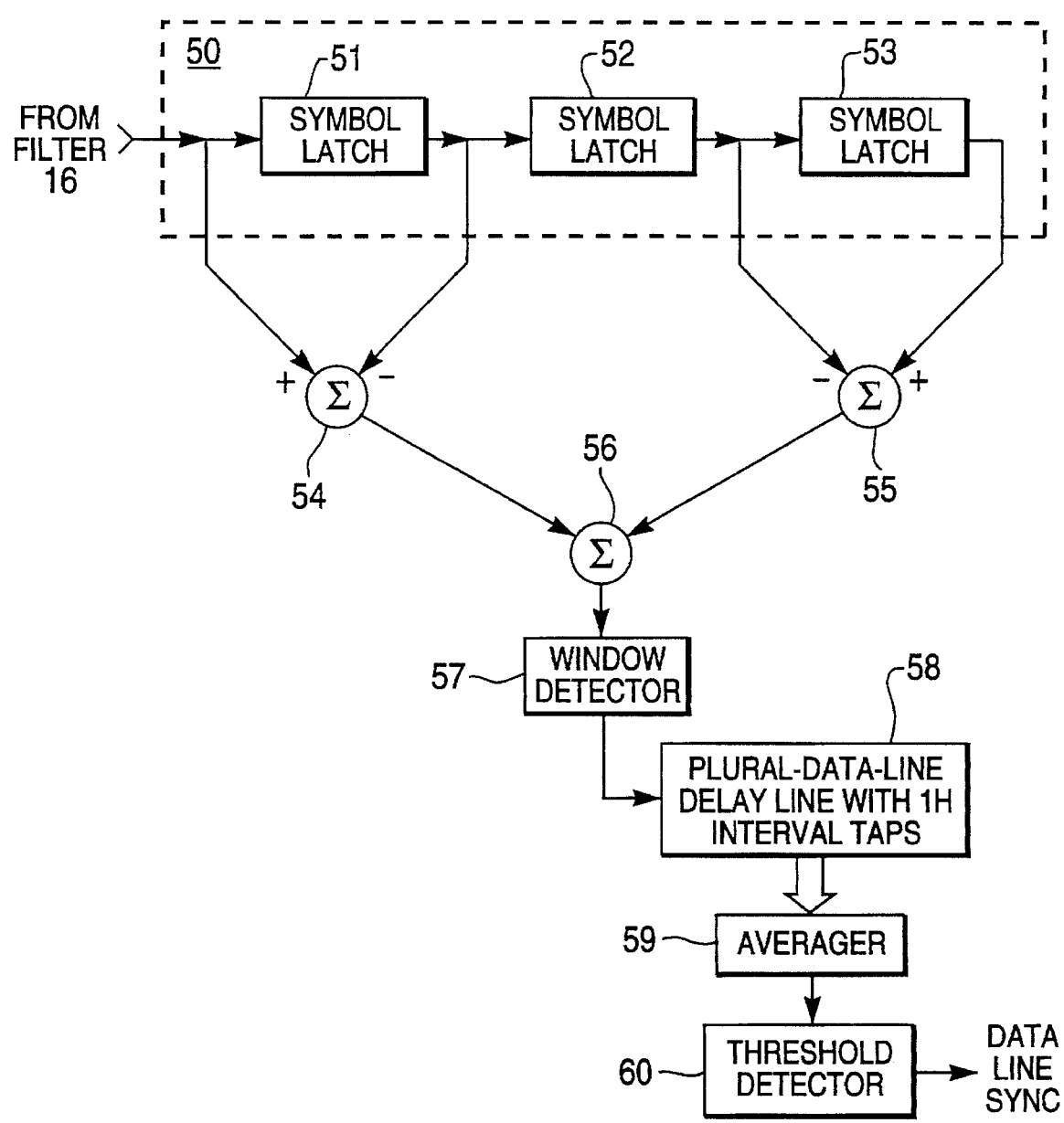
FIG. 6 is a schematic diagram of a line sync detector used in the digital radio receiver of FIG. 1.

FIG. 6 shows details of one possible construction of the data line sync detector 203 used in the digital radio receiver 10 of FIG. 1 designed for the Grand Alliance system. The channel-equalization filter 16 response is supplied to a cascade connection 50 of symbol latches 51, 52 and 53. The channel-equalization filter 16 response is also supplied as a minuend input signal to a digital subtractor 54, which receives a subtrahend input signal from the symbol latch 51. The symbol latch 52 supplies a subtrahend input signal to a digital subtractor 55, which receives a minuend input signal from the symbol latch 53. A digital adder 56 sums the difference output signals of the subtractors 54 and 55. The resulting sum signal from the adder 56 is supplied to a window detector 57, which supplies an output ONE only when the sum output from the adder 56 is in a range more likely descriptive of a data line sync code than any other code group, and which otherwise supplies an output ZERO. That is, the elements 51–56 function as a correlator for data line sync code groups.

To reduce the likelihood that data line sync pulses will be erroneously generated or omitted, the response of the window detector 57 is supplied to a tapped digital delay line 58, having several taps (e.g., 8, 12 or 16) at one-data-line intervals. An averager 59 comprising a respective array of digital adders averages the tap responses of the tapped digital delay line 58 and supplies the result to a further threshold detector 60. The threshold of threshold detector 60 is set so that it responds to at least some large fraction of the tap responses of the tapped digital delay line 58 being ONEs to supply an output ONE as its response, indicative data line change. When fewer than this fraction of the tap responses of the tapped digital delay line 58 are ONEs, the threshold detector 60 supplies an output ZERO as its response. The response of the threshold detector 60 is used to supply data line sync pulses to the AFPC circuitry 202 of FIG. 1. The response of the threshold detector 60 is used as count input by the data line counter 210 of FIG. 1 and as count reset by the sample-per-line counter 204 when it fails to roll over its count at the proper time.

As an aid for more rapidly implementing calculations with a DSP, it is known that minor corrections to filter coefficients can be deferred until after new sets of samples are collected as bases for subsequent updatings of each of the N filter coefficients. Such procedure relies on the corrections to the filter coefficients being made in gradual enough steps that the inaccuracies, which are introduced by using former weighting coefficients in determining the departure of the FIR filter response from the best estimate of what its response should be, tend usually to be relatively small compared to those departures.

The calculation of updated coefficients takes place over the duration of (2 L+2N) samples in the circuitry of FIGS. 1, 2, 4 and 5, with the second FIR filter 32 being used only on an intermittent basis. Updated coefficients for the first FIR filter 31 are generated during intervals of (L+N) samples, which intervals are separated by intervening intervals of (L+N) samples during which the second FIR filter 32 performs no calculations of updated coefficients for the first FIR filter 31. One can view the application of corrections to the first FIR filter coefficients every (2 L+2N) samples as a deferred application of corrections, supposing that corrections to these first FIR filter coefficients are also calculated during the "intervening" intervals.

FIGS. 7, 8, 10 and 11 show a preferred embodiment of the invention in which the second FIR filter 32 calculates updated coefficients for the first FIR filter 31 during the "intervening" intervals. Calculations proceed using the following equation instead of equation (4).

$$W_k^{(m+1)} = W_k^m + \mu \cdot \Delta_k^{(m-1)} \qquad (8)$$

The corrections to the coefficients of the first FIR filter 31 are made in gradual enough steps that the inaccuracies, which are introduced by using former weighting coefficients in determining the departure of the first FIR filter 31 response from the best estimate of what its response should be, tend usually to be relatively small compared to those departures.

Figure 7:
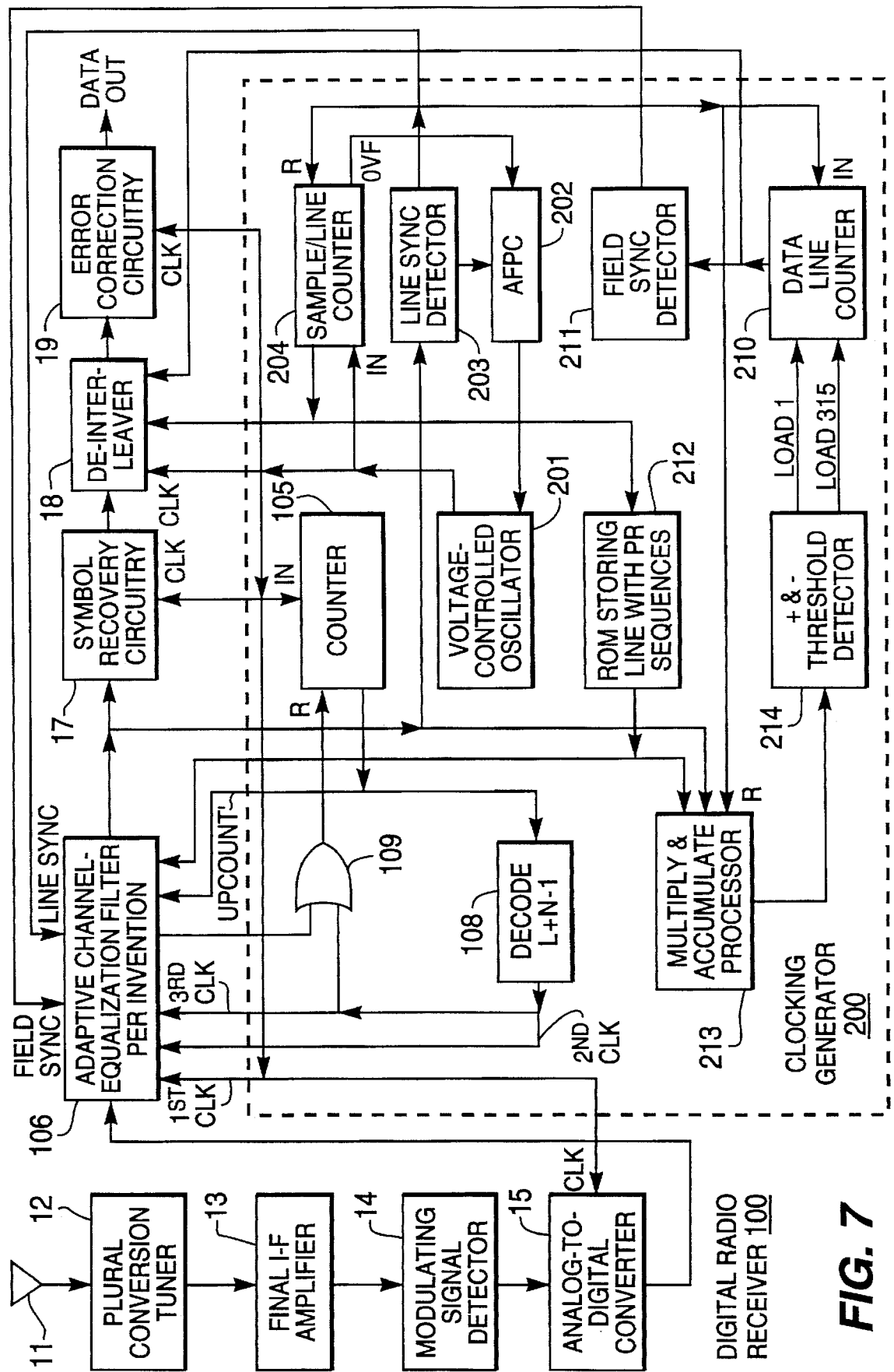
FIG. 7 is a schematic diagram of a digital radio receiver, as may be employed in a high-definition television set, which digital radio receiver includes an adaptive channel-equalization filter constructed in accordance with a second embodiment of the invention.

FIG. 7 shows a digital radio receiver 100 that differs from the digital radio receiver 10 of FIG. 1 in that an adaptive channel-equalization filter 106 and a clocking signal generator 200 replace the adaptive channel-equalization filter 16 and the clocking signal generator 20. The decoders 206, 207 and 208 are dispensed with in the clocking signal generator 200; so is the counter 205, which can count to at least (2 L+2N-1) and can be jam loaded to (L+2N-1). The clocking signal generator 200 includes a counter 105, which can count to at least (L+N-1) to generate a count UPCOUNT', in place of the counter 205. A decoder 108 decodes UPCOUNT' reaching a value (L+N-1) to generate a ONE applied as first input signal to a two-input OR gate 109. The response of the OR gate 109 applied to a reset input of the counter 105 resets UPCOUNT' to zero initial value on the next first clock signal.

The channel-equalization filter 106 uses second and third clock signals that are identical to each other and are provided by the output signal of the decoder 108. The channel-equalization filter 106 includes the trailing edge detector 42 of FIG. 4 for detecting when the DSP 40 finishes the initialization of the filter coefficients. The output signal from the trailing edge detector 42 is supplied as second input signal to the OR gate 109, for resetting the counter 105 UPCOUNT' output to zero initial value when the initialization of the filter coefficients is completed.

Figure 8:
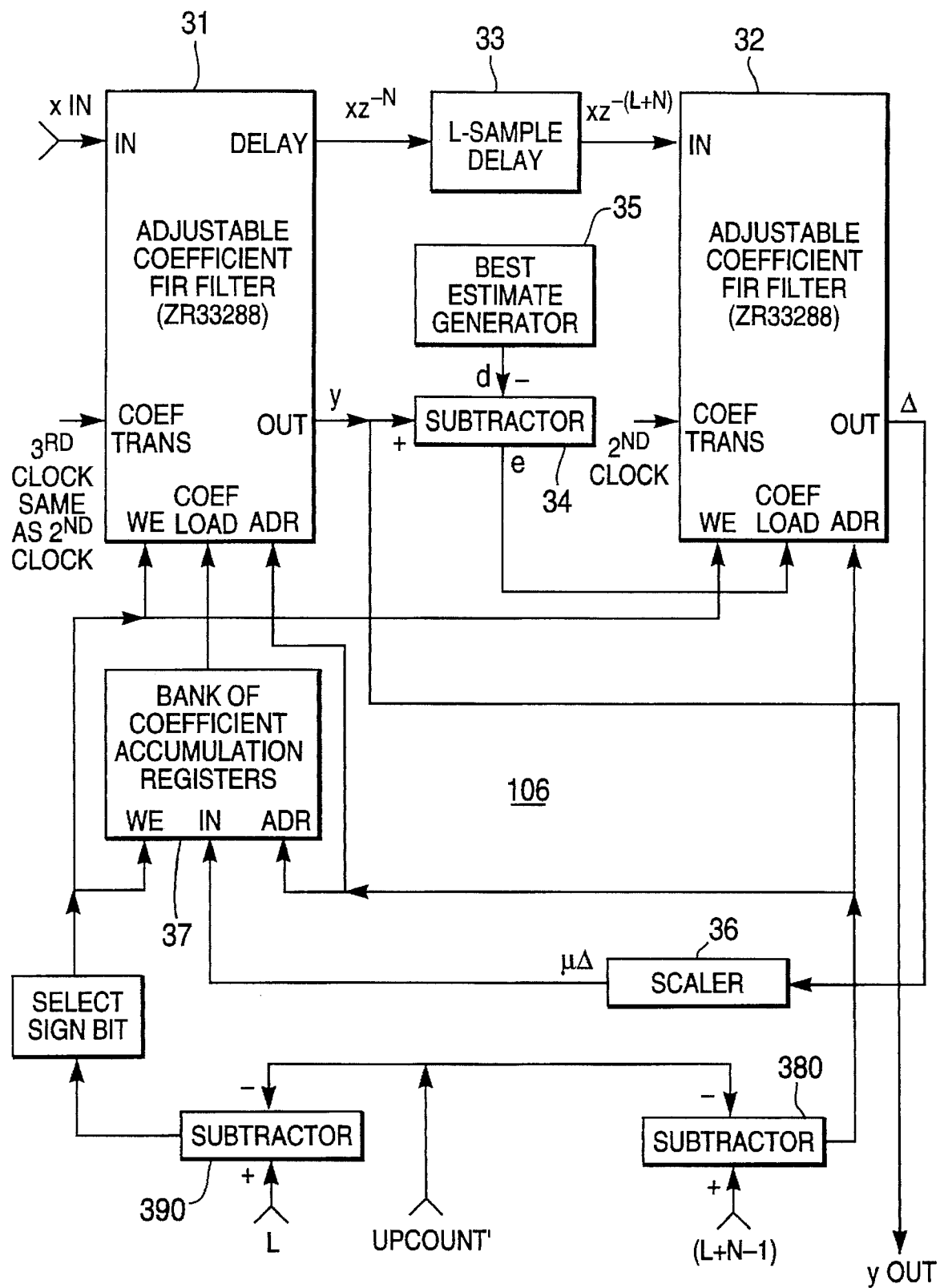
FIG. 8 is a schematic diagram of an adaptive channel-equalization filter constructed from first and second video-rate digital filters, in accordance with the second embodiment of the invention.
Figure 9:
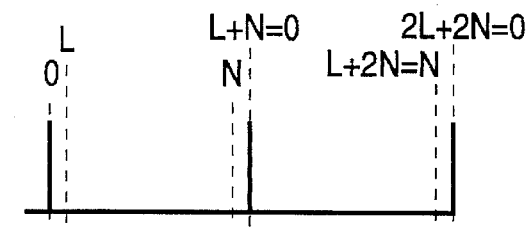
FIG. 9 is a timing diagram of the sequence of operations in the FIG. 8 channel-equalization filter circuitry.
Figure 9:
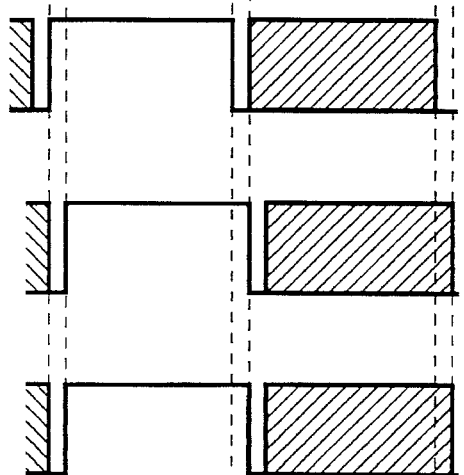
Figure 9:
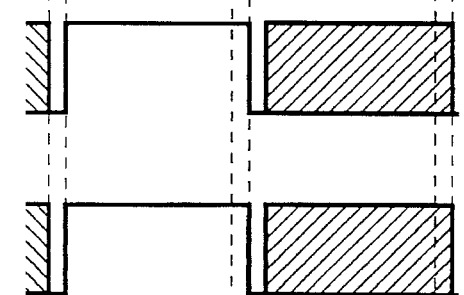
Figure 9:
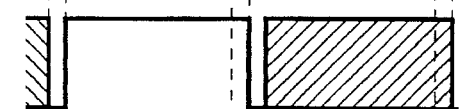
Figure 9:
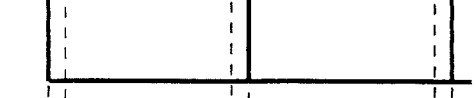
Figure 9:
Figure 9:
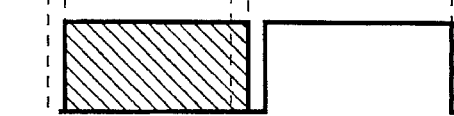
Figure 9:

FIG. 8 shows some of the details of the channel-equalization filter 106 and is generally similar to FIG. 2 that shows some of the details of the channel-equalization filter 16. In the channel-equalization filter 106 of FIG. 8, a digital subtractor 380 supplies its difference output signal an address both to the bank 316 of shadow coefficient registers in the first FIR filter 31 and to the bank 326 of shadow coefficient registers in the second FIR filter 32, rather than an address being supplied by the subtractors 38 and 39. The subtractor 380 receives UPCOUNT' as its subtrahend input signal and wired (L+N−1) as its minuend input signal. The difference output signal from the digital subtractor 380 is also applied directly to the address input of the bank 37 of coefficient accumulation registers. The values of UPCOUNT' signal below L generate invalid addresses. A subtractor 390 subtracts UPCOUNT' signal from L, and the sign bit of the difference is selected by appropriate wired connection to provide a write enable signal to the bank 37 of coefficient accumulation registers (and to the banks 316 and 326 of shadow coefficient registers, if desired), FIG. 9 is a timing diagram showing the resulting changes in operation brought about by the circuitry of FIGS. 7 and 8 with the modifications in accordance with the invention. Signals associated with the block of samples preceding the current one are shown in diagonal crosshatch running from upper left to lower right. Signals associated with the block of samples succeeding the current one are shown in diagonal crosshatch running from lower left to upper right. Signals associated with the current block of samples are shown without crosshatch.

As noted before, the second and third clock signals are identical in the operation diagrammed in FIG. 9, rather than being staggered in phase as in the operation diagrammed in FIG. 3. Furthermore, the second and third clock signals repeat every (L+N) samples, rather than every (2 L+2N) samples as in the operation diagrammed in FIG. 3. There is a shift of L samples between the alternate zeroes of UPCOUNT', which count is performed on a modulo-(L+N) basis, compared to the zeroes of UPCOUNT shown in the FIG. 3 timing diagram, which count is performed on a modulo-(2 L+2N) basis. Other than for these differences, in the operation diagrammed in FIG. 9, the current block of samples is processed through the first FIR filter 31 and the second FIR filter 32 similar to the way a block of samples is processed in the operation diagrammed in FIG. 3.

Figure 10:
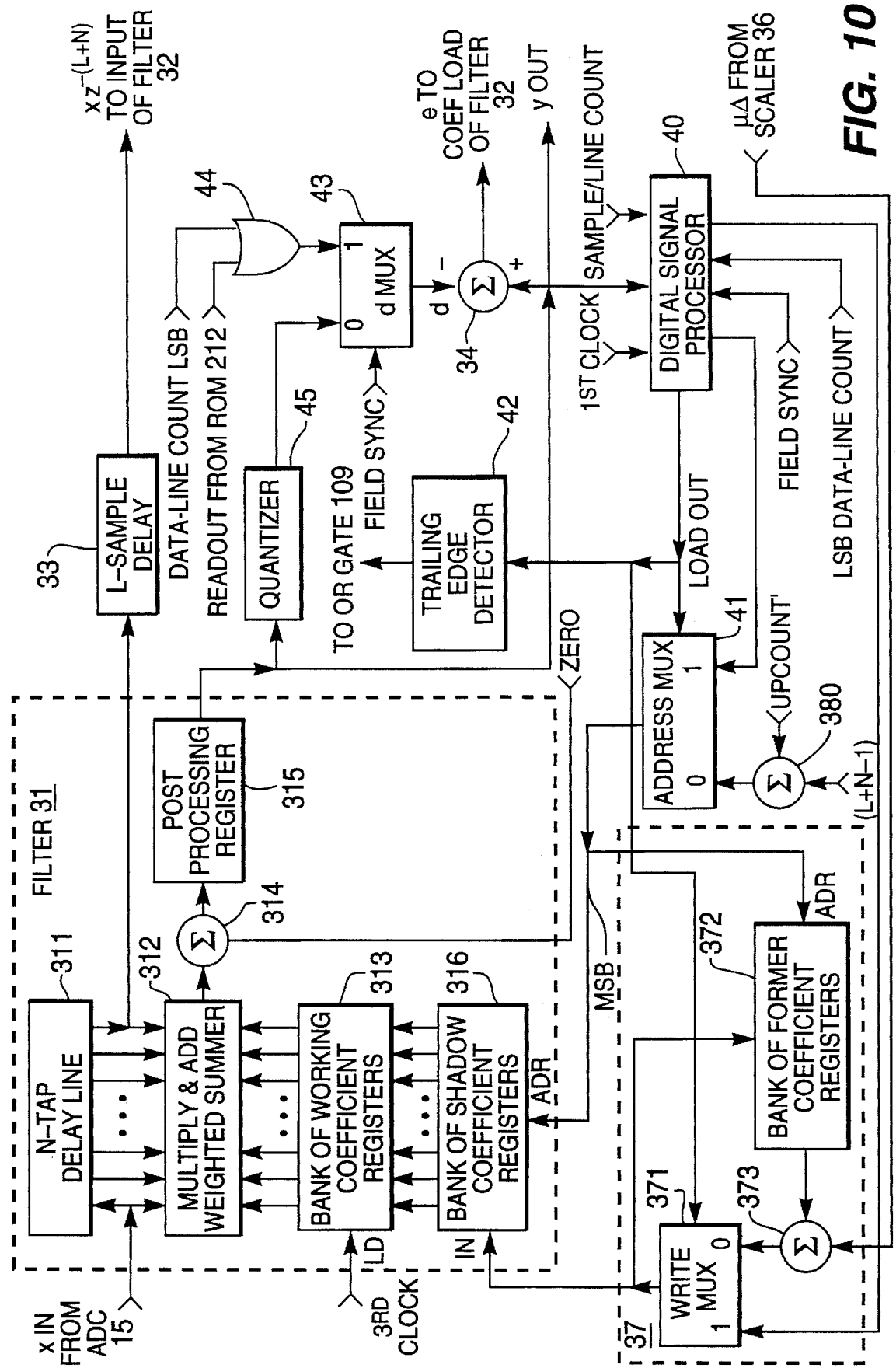
FIG. 10 is a more detailed schematic diagram of the portion of the FIG. 8 adaptive channel-equalization filter including the first video-rate digital filter.

FIG. 10 shows more particularly how addressing is applied to the bank 316 of shadow coefficient registers in the first FIR filter 31 and to the bank 37 of coefficient accumulation registers via the address multiplexer 41 when the modified circuitry of FIGS. 7 and 8 is employed. The trailing edge detector 42 is also indicated to supply input signal to the OR gate 109. Otherwise the FIG. 10 connections are the same as those shown in FIG. 4.

Figure 11:
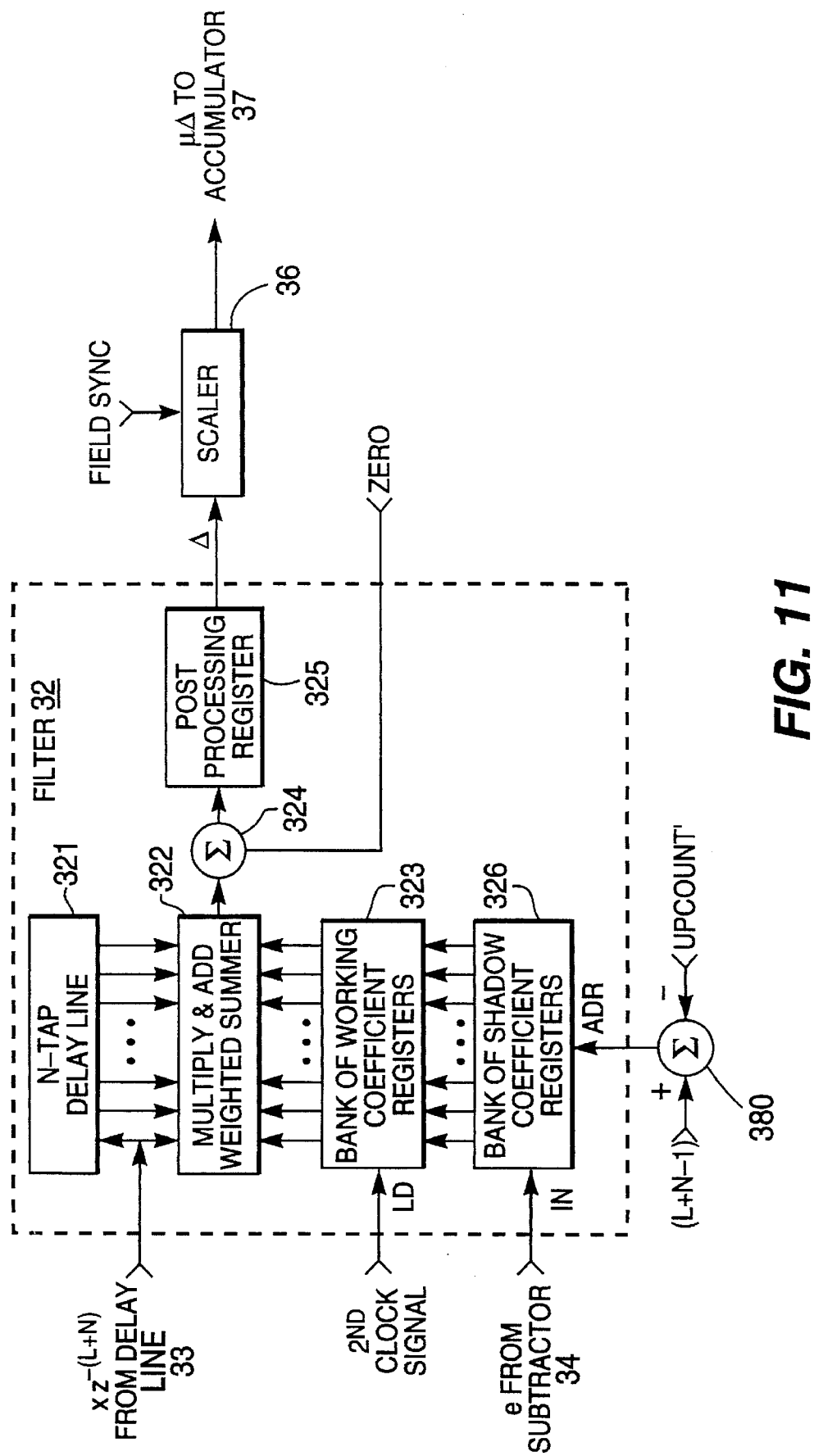
FIG. 11 is a more detailed schematic diagram of the portion of the FIG. 8 adaptive channel-equalization filter including the second video-rate digital filter.

FIG. 11 shows more particularly how addressing is applied to the bank 326 of shadow coefficient registers in the second FIR filter 32 by the digital subtractor 380. Otherwise the FIG. 11 connections are the same as those shown in FIG. 5.

The circuitry shown in FIGS. 7, 8, 10 and 11 is such that in custom designs, the adder 372 can be supplied its second summand input by the previously calculated $W_k$ coefficients as temporarily stored in the bank 316 of "shadow" coefficient registers, rather than the bank 372 of "former" coefficient registers, so that the bank 372 of N "former" coefficient registers can be dispensed with. The circuitry shown in FIGS. 7, 8, 10 and 11 does not calculate updated filter coefficients on a completely continuous basis, however, but only on a substantially continuous basis. There are short L-sample periods between each block of samples of x that are processed to compute updated $W_k$ samples.

FIGS. 12–15 show a third embodiment of the invention which eliminates these short L-sample periods between blocks of samples of x that are processed to compute updated $W_k$ samples The elimination of these short L-sample periods is made possible by deferring the updating of the $W_k$ coefficients, not to the second block of x samples after the block of x samples from which the updated $W_k$ coefficients are calculated, but rather to the third block of x samples after the block of x samples from which the updated $W_k$ coefficients are calculated. Calculations proceed using the following equation instead of equation (4) or (8).

$$W_k^{(m+1)} = W_k^m + \mu \cdot \Delta_k^{(m-2)} \tag{9}$$

Figure 12:
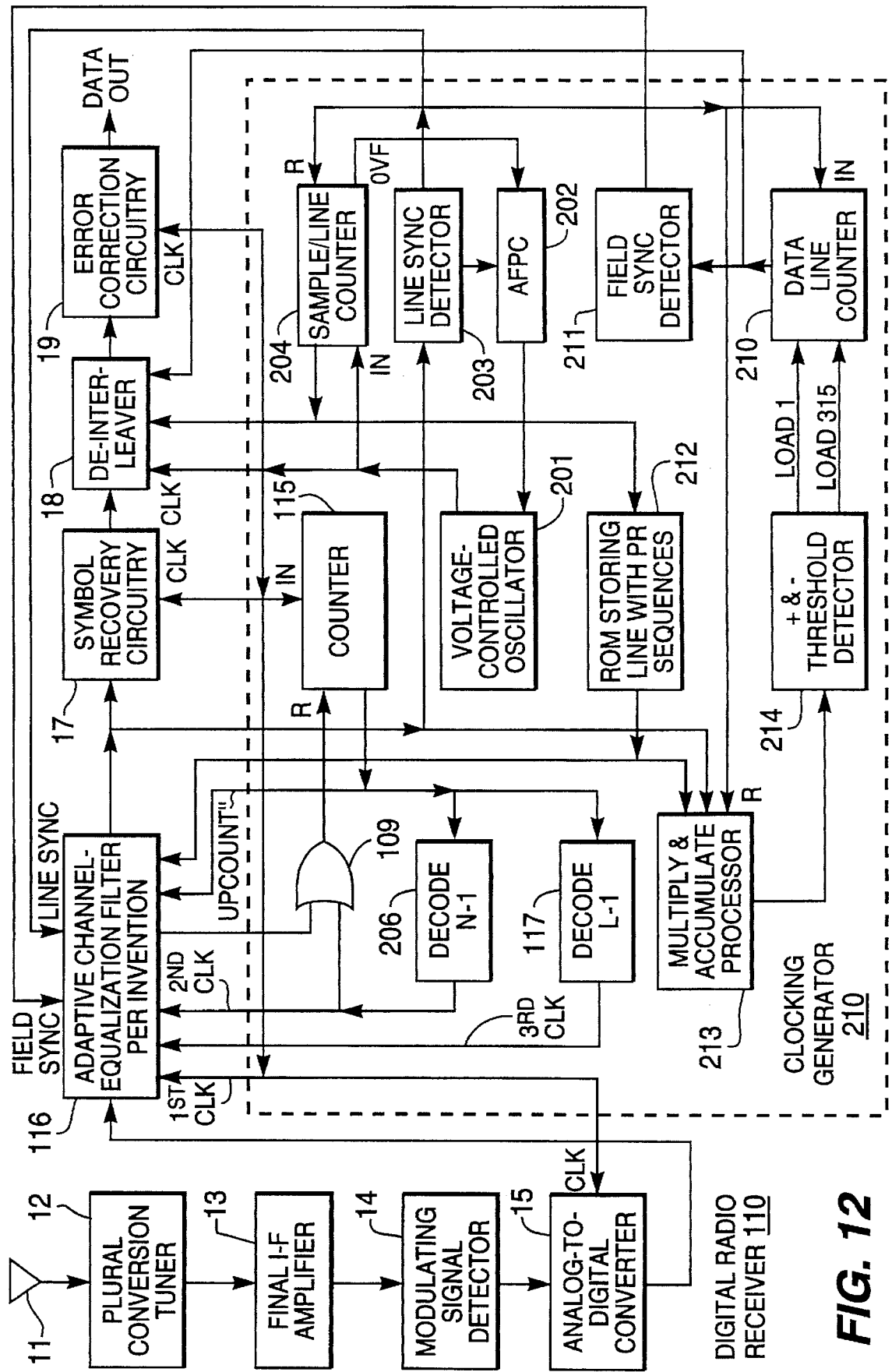
FIG. 12 is a schematic diagram of another digital radio receiver, as may be employed in a high-definition television set, which other digital radio receiver includes an adaptive channel-equalization filter constructed in accordance with a third embodiment of the invention.

FIG. 12 shows a digital radio receiver 110 that differs from the digital radio receiver 10 of FIG. 1 in that an adaptive channel-equalization filter 116 and a clocking signal generator 210 replace the adaptive channel-equalization filter 16 and the clocking signal generator 20. The decoders 207 and 208 are dispensed with in the clocking signal generator 210; so is the counter 205, which can count to at least (2 L+2N−1) and can be jam loaded to (L+2N−1). The clocking signal generator 210 includes a counter 115, which can count to at least (N−1) to generate a count UPCOUNT", in place of the counter 205. A decoder 117 decodes UPCOUNT" reaching a value (L−1) to generate a ONE, the ONEs generated by the decoder 117 being supplied as a second clock signal to the second FIR filter 32 in the channel-equalization filter 116. The decoder 206 decodes UPCOUNT" reaching a value (N−1) to generate a ONE applied as first input signal to the two-input OR gate 109. The response of the OR gate 109 applied to a reset input of the counter 115 resets UPCOUNT" to zero initial value on the next first clock signal. The channel-equalization filter 116 includes the trailing edge detector 42 for detecting when the DSP 40 finishes the initialization of the filter coefficients. The output signal from the trailing edge detector 42 is supplied as second input signal to the OR gate 109, for resetting the counter 115 UPCOUNT" output to zero initial value when the initialization of the filter coefficients is completed. The ONEs generated by the decoder 206 are also supplied as a third clock signal to the first FIR filter 31 in the channel-equalization filter 116. Both the second and third clock signals recur every N samples in the FIG. 12 circuitry, with the third clock signal lagging the second clock signal by L samples.

Figure 13:
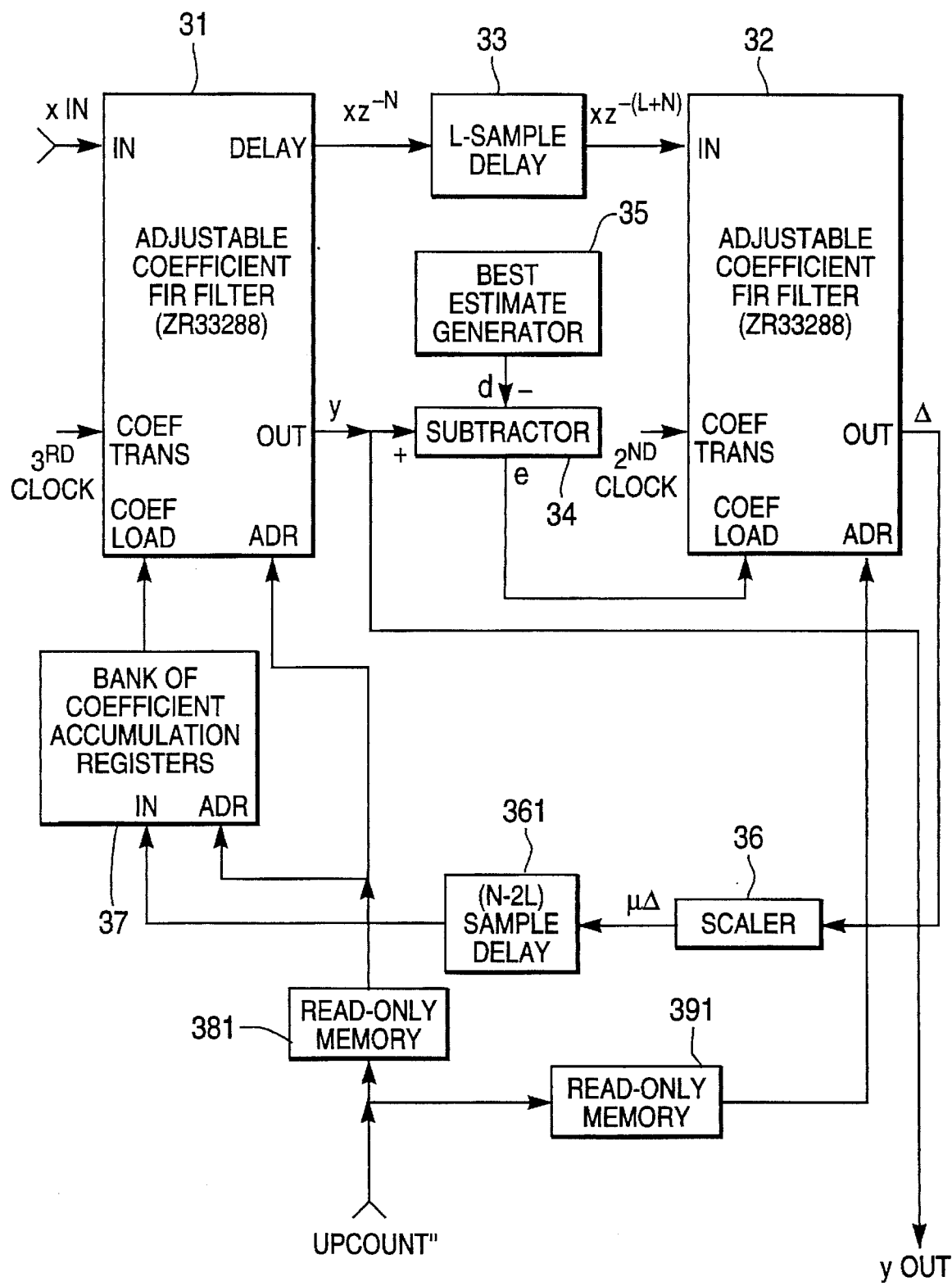
FIG. 13 is a schematic diagram of an adaptive channel-equalization filter constructed from first and second video-rate digital filters, in accordance with the third embodiment of the invention.

FIG. 13 shows some of the details of the channel-equalization filter 116 and is generally similar to FIG. 2 that shows some of the details of the channel-equalization filter 16 and to FIG. 8 that shows some of the details of the channel-equalization filter 106. In the channel-equalization filter 116 of FIG. 13, the UPCOUNT" signal from the counter 115 is applied directly to the address input of read-only memories 381 and 391. The ROM 381 is addressed by UPCOUNT" to supply addresses both to the bank 316 of shadow coefficient registers in the first FIR filter 31 and to the bank 37 of coefficient accumulation registers. When UPCOUNT" increments from 2 L to (N−1), the output signal from the ROM 381 decrements from (N−1) to 2 L; and when UPCOUNT" increments from zero to (2 L−1), the output signal from the ROM 381 decrements from (2 L−1) to zero. The ROM 391 is addressed by UPCOUNT" to supply addresses to the bank 326 of shadow coefficient registers in the second FIR filter 32. When UPCOUNT" increments from L to (N−1), the output signal from the ROM 391 decrements from (N−1) to L; and when UPCOUNT" increments from zero to (L−1), the output signal from the ROM 391 decrements from (L−1) to zero. The UPCOUNT" signal ranges only from zero to (N−1), so only valid addresses are generated by the ROMs 381 and 391.

As previously noted, in the channel-equalization filter 116 of FIG. 13, updating of the $W_k$ coefficients is deferred to the third block of x samples after the block of x samples from which the updated $W_k$ coefficients are calculated. Accordingly, a delay of (N−2 L) samples is introduced by connecting a delay line 361 in cascade with the scaler 36, either before the scaler 36 or after it as shown in FIG. 13.

Figure 14:
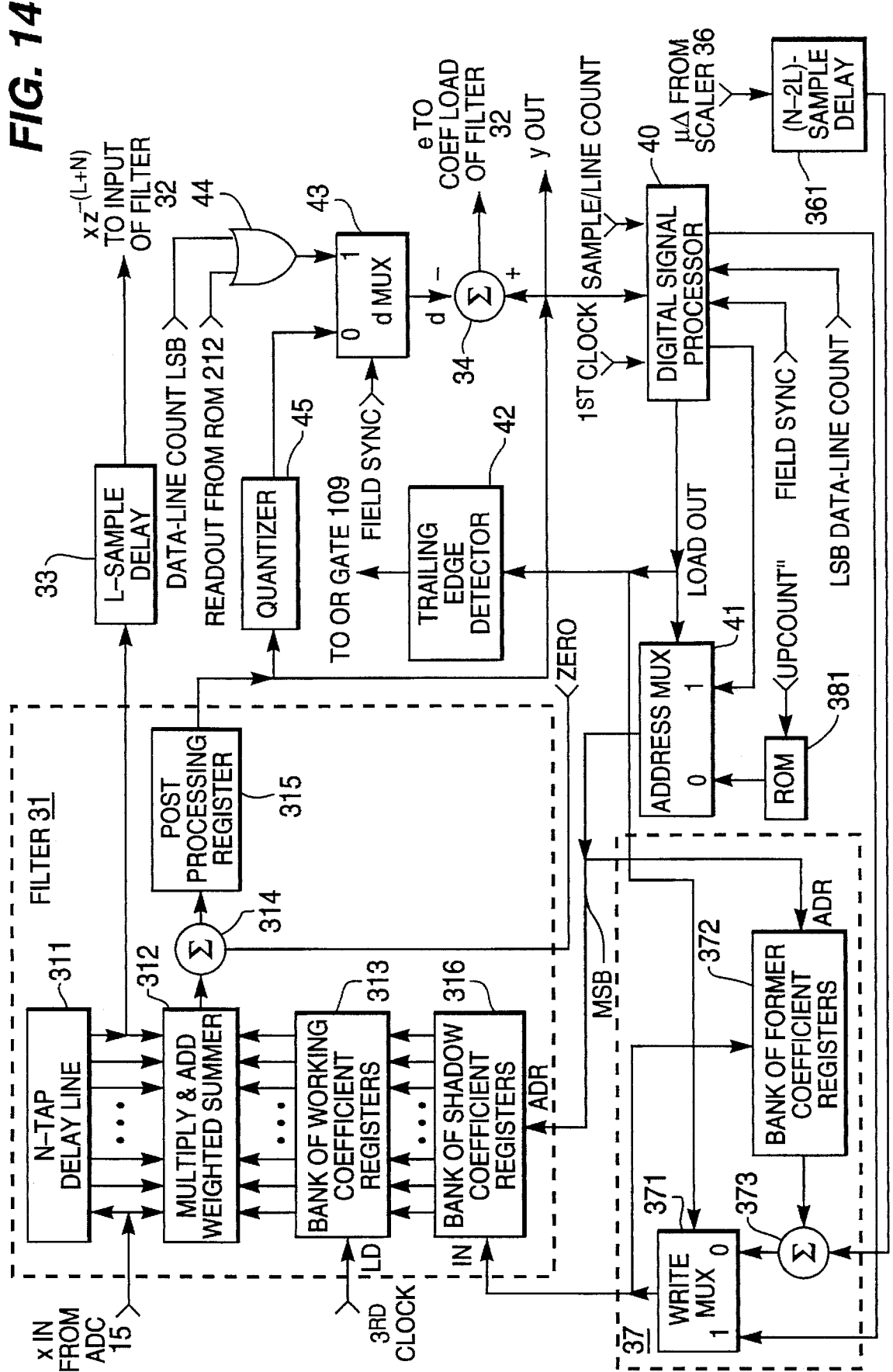
FIG. 14 is a more detailed schematic diagram of the portion of the FIG. 12 adaptive channel-equalization filter including the first video-rate digital filter.

FIG. 14 shows more particularly how addressing is applied from the ROM 381 via the address multiplexer 41 to the bank 316 of shadow coefficient registers in the first FIR filter 31. FIG. 14 also shows the (N−2 L)-sample delay line 361 inserted in the connection from the scaler 36 to the second summand input connection of the adder 373. Otherwise the FIG. 14 connections of the first FIR filter 31 are the same as those shown in FIG. 5 or in FIG. 11.

Figure 15:
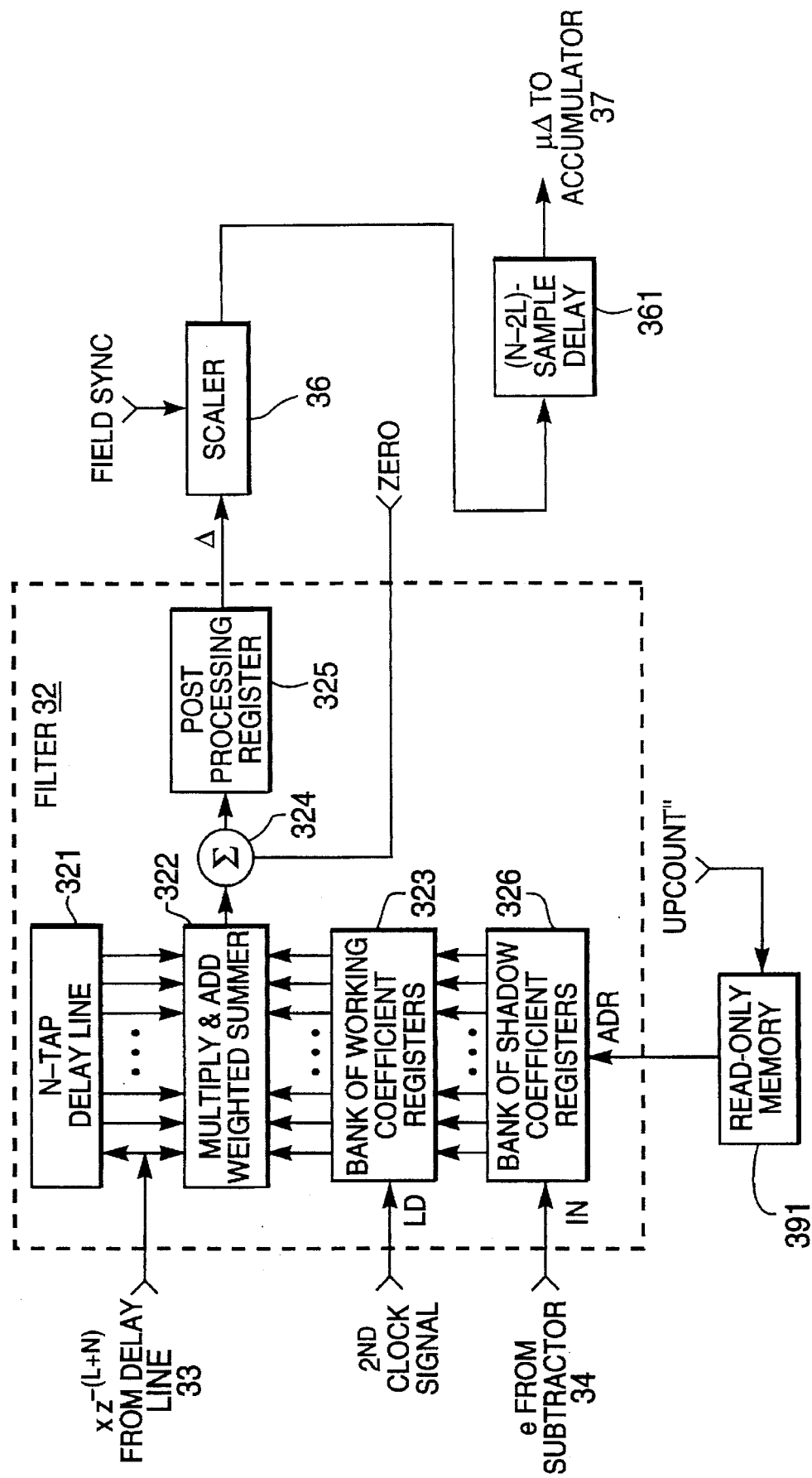
FIG. 15 is a more detailed schematic diagram of the portion of the FIG. 12 adaptive channel-equalization filter including the second video-rate digital filter.

FIG. 15 shows more particularly how addressing is applied to the bank 326 of shadow coefficient registers in the second FIR filter 32 by the ROM 391. Otherwise the FIG. 15 connections of the second FIR filter 32 are the same as those shown in FIG. 5 or in FIG. 11. Presuming the delay line 361 is in cascade connection after the scaler 36, as shown in FIG. 13, the connections of the first FIR filter 31 can be the same as those shown in FIG. 4 or in FIG. 10.

The ROMs 381 and 391 can be replaced by respective address counters, the address counter replacing ROM 381 being periodically reset by third clock signal, and the address counter replacing ROM 391 being periodically reset L samples later by a fourth clock signal generated by a decoder decoding count from the counter 115 reaching (2 L−1) to furnish a pulse when the next first clock signal occurs. Other address generating circuitry can alternatively replace ROMs 381 and 391 for performing modulo-N subtractions of L and of 2 L, respectively. The counter 115 can supply a descending DOWNCOUNT" that is the logic complement of the ascending UPCOUNT", which DOWNCOUNT" can be delayed by L samples and by 2 L samples using a tapped digital delay line. Then, DOWNCOUNT" delayed by L samples is used to address the bank 37 of coefficient accumulation registers and the bank 316 of shadow coefficient registers in the first FIR filter 31; and DOWNCOUNT" delayed by 2 L samples is used to address the bank 326 of shadow coefficient registers in the second FIR filter 32.

Figure 16:
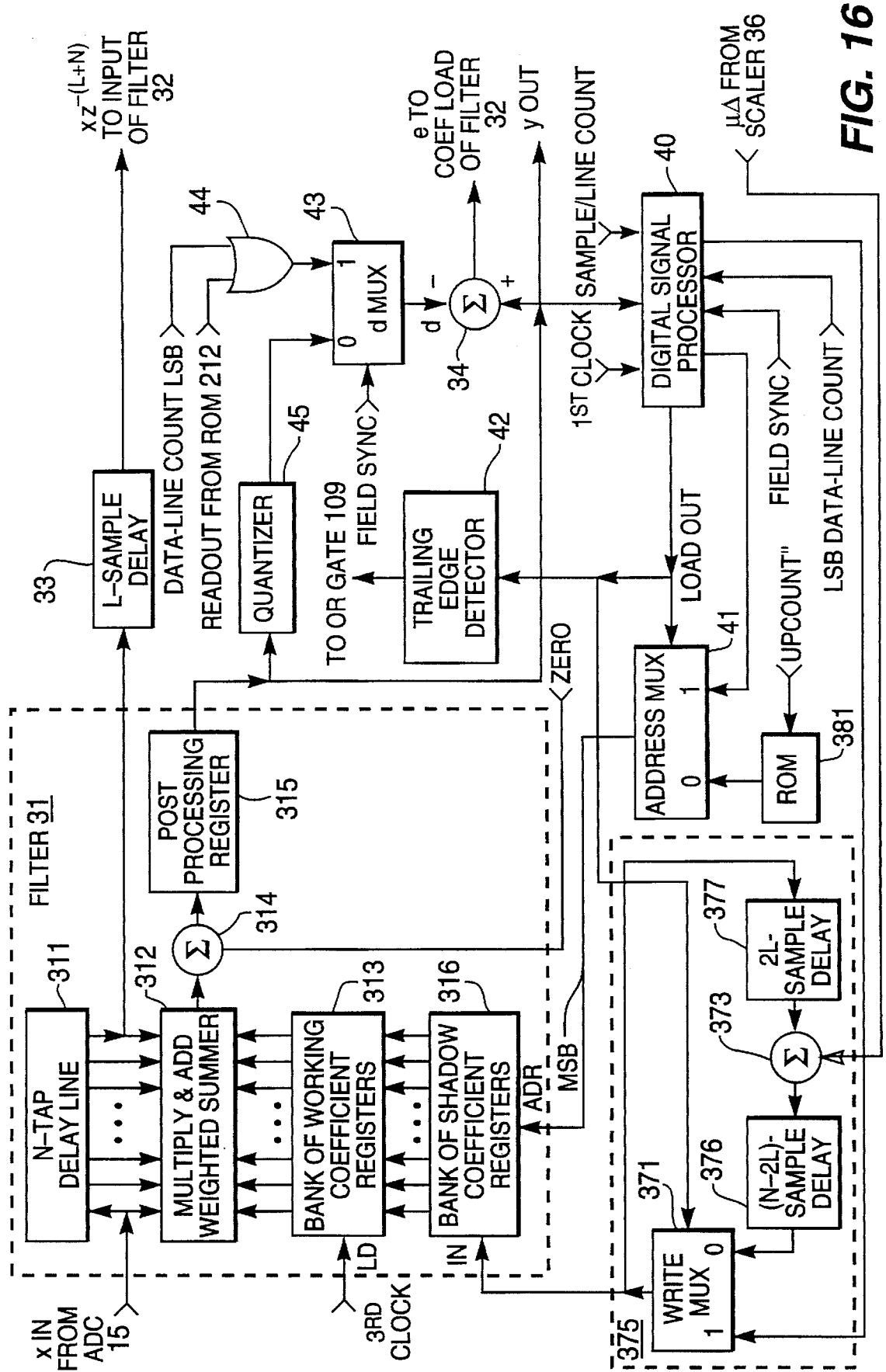
FIG. 16 is a schematic diagram of a modification that can be made to the portion of the FIG. 13 adaptive channel-equalization filter including the first video-rate digital filter.

FIG. 16 shows somewhat different connections that can be made to the first FIR filter 31 in a modification of the channel-equalization filter 116 of FIG. 13. The bank 37 of "former" coefficient registers is replaced by temporary storage circuitry 375 for "former" coefficients. The temporary storage circuitry 375 retains the write multiplexer 371, the first input connection of the write multiplexer 371 for receiving addresses from the DSP 40, the control connection of the write multiplexer 371 for receiving load out commands from the DSP 40 to control selection by the multiplexer 371, and the output connection of the write multiplexer 371 for supplying addresses to the bank 316 of shadow coefficient registers in the first FIR filter 31. The temporary storage circuitry 375 also retains the digital adder 373, but a delay line 376 introduces a delay of (N−2 L) sample intervals between the sum output port of the adder 373 and the second input connection of the write multiplexer 371. A delay line 376 delays the $W_k$ coefficients furnished from the output port of the write multiplexer 371 by 2 L sample intervals to provide the adder 373 its first summand input signal. The adder 373 receives its second summand input signal directly from the scaler 36 output connection.

The third embodiment of the invention shown in FIGS. 12–15 is less preferred because of the need for the additional (N−2 L)-sample delay line 361. If constructed as a read-then-write-over RAM, the delay line 361 requires an address counter in addition to the RAM unless (N−2 L) is one-half or one-quarter the number of samples per line, so the less significant bits of counter 204 output can be used to address the RAM. The modification of FIG. 16 also needs an (N−2 L)-sample delay line 376. However, supposing the (N−2 L)-sample delay line 376 and the 2 L-sample delay line 37 are constructed from RAM with a suitable address counter, the RAM replaces equivalent RAM needed for "former" coefficient registers. The 2 L-sample delay line 37 can be addressed by the least significant bits of one of the counters 115, 204 or the one counting to (N−2 L), supposing 2 L to be a submultiple of the full count of one of these counters, which is likely if 2 L is an integral power of two.

One skilled in the art of digital circuit design will be enabled by acquaintance with the content of the foregoing specification to design a number of variants of the clocking generator 20, 200 or 210 to generate various other embodiments of the invention. Where (N+L) is made a submultiple of the number of samples per data line, a single counter can replace the counters 204 and 205 in the clocking generator 20, for example, or the counters 204 and 105 in the clocking generator 200. Where the number of samples per data line is a multiple of N, a single counter can replace the counters 204 and 115 in the clocking generator 210.

In digital radio receivers that use digital detection of the final IF amplifier 13 response, the VCO 201 may comprise a VCO supplying an oversampling clock signal at two (or four) times symbol rate and a two (or four) times frequency divider for deriving the first clock signal from that oversampling clock signal. The oversampling clock signal is used for implementing the digital detection, and the digital detection result is subsampled at first clock signal rate to provide input signal to the channel-equalization filter 16, 106 or 116.

Equalization filters are known which cascade a finite-impulse-response (FIR) filter with an infinite-impulse-response (IIR) filter. The IIR filter can be formed from a digital adder with a component FIR filter connected from the sum output port of the digital adder to a first of its summand input ports, the input and output ports of the IIR filter being at the second summand input port of the digital adder and at the sum output port of the digital adder, respectively. To avoid the instability problems normally associated with IIR filters, the coefficients of the component FIR filter in the IIR filter are initially adjusted by a DSP responding to training signals, such as a ghost cancelation reference (GCR) signal, contained in portions of the transmitted data. Thereafter, the coefficients of the component FIR filter can be computed in accordance with the precepts of the invention, using a further FIR filter with equivalent kernel width to implement decision directed techniques in which best estimates of correct filter response are formed by quantizing actual filter response. In equalization filters which cascade a finite-impulse-response (FIR) filter with the infinite-impulse-response (IIR) filter, the coefficients of the filters are independently adjusted.

What is claimed is:

1. A digital radio receiver for recovering digital samples of a modulating signal, in response to a received carrier wave modulated in accordance with a digital signal, which modulating signal is at times subject to undesirable amounts of multipath distortion, in combination with a channel-equalization filter comprising:

first and second finite-impulse-response (FIR) filters, each having a respective input port to which digital samples of said modulating signal are applied, each having a respective output port, and each being of an N-tap type, the taps of which are adaptively weighted, said first FIR filter responding to said modulating signal applied to its said input port to generate at its output port an output signal of said channel-equalization filter, and said second FIR filter responding to said modulating signal applied to its said input port to generate at its output port corrections for updating the tap weights of said first FIR filter;

a digital comparator connected for comparing samples of said first FIR filter response to corresponding samples of an ideal response, thereby to generate updated tap weights of said second FIR filter;

a bank of coefficient accumulation registers for respectively accumulating the corrections for updating the tap weights of said first FIR filter, as those corrections are generated at the output port of said second FIR filter, with the previous values of the corresponding tap weights of said first FIR filter, thereby to generate updated tap weights of said first FIR filter;

means for applying said updated tap weights of said first FIR filter to said first FIR filter; and means for delaying the corrections for updating the tap weights of said first FIR filter, as those corrections are generated at the output port of said second FIR filter, the resulting delayed corrections for updating the tap weights of said first FIR filter being supplied to said bank of coefficient accumulation registers for respective accumulation with corresponding ones of the tap weights of said first FIR filter as previously temporarily stored within said bank of coefficient accumulation registers.

2. A digital radio receiver for recovering digital samples of a modulating signal, in response to a received carrier wave modulated in accordance with a digital signal, which modulating signal is at times subject to undesirable amounts of multipath distortion, in combination with a channel-equalization filter comprising:

first and second finite-impulse-response (FIR) filters, each having a respective input port to which digital samples of said modulating signal are applied, each having a respective output port, and each being of an N-tap type, the taps of which are adaptively weighted, said first FIR filter responding to said modulating signal applied to its said input port to generate at its output port an output signal of said channel-equalization filter, and said second FIR filter responding to said modulating signal applied to its said input port to generate at its output port corrections for updating the tap weights of said first FIR filter;

a digital comparator connected for comparing samples of said first FIR filter response to corresponding samples of an ideal response, thereby to generate updated tap weights of said second FIR filter;

a digital adder for generating a sum output signal responsive to first and second summand input signals, said corrections for updating the tap weights of said first FIR filter being the first summand input signal applied to said digital adder;

a first delay line, having a respective input connection to which the sum output signal from said digital adder is applied for supplying updated first FIR filter tap weights, temporarily storing a first number of updated first FIR filter tap weights serially received at its respective input connection, and having an output connection for supplying delayed updated first FIR filter tap weights;

a second delay line having a respective input connection for receiving delayed updated first FIR filter tap weights, temporarily storing a second number of updated first FIR filter tap weights serially received at its respective input connection, and having a respective output connection for supplying further delayed updated tap weights of said first FIR filter to said digital adder as the second summand input signal thereto, the first and second numbers having a sum equal to the number of tap weights of said first FIR filter; and means for applying the delayed updated tap weights of said first FIR filter, as supplied from the output connection of said first delay line, to said first FIR filter and to the input connection of said second delay line.

3. A digital radio receiver for recovering digital samples of a modulating signal, in response to a received carrier wave modulated in accordance with a digital signal, which modulating signal is at times subject to undesirable amounts of multipath distortion, in combination with an adaptively-weighted channel-equalization filter comprising:

first and second finite-impulse-response (FIR) filters, each having a respective input port to which digital samples of said modulating signal are applied, each having a respective output port, and each being of an N-tap type, the taps of which are adaptively weighted, said first FIR filter responding to said modulating signal applied to its said input port to generate at its output port an output signal of said channel-equalization filter, and said second FIR filter responding to said modulating signal applied to its said input port to generate at its output port corrections for updating the tap weights of said first FIR filter;

a digital comparator essentially consisting of a digital subtractor connected for receiving samples of said first FIR filter response as minuend signal, for receiving corresponding samples of an ideal response as subtrahend signal, and generating updated tap weights of said second FIR filter as difference signal samples therefrom;

a multiplexer having an output port connected for supplying said digital subtractor said corresponding digital samples of said ideal response, having first and second input ports, being conditioned by a control signal thereof having a first value for reproducing at the output port thereof signal received at the first input port thereof, and being conditioned by said control signal thereof having a second value for reproducing at the output port thereof signal received at the second input port thereof;

means for generating said control signal for said multiplexer, responding to portions of said channel-equalization filter response to said modulating signal that contain a training signal for generating said first value of said control signal for said multiplexer, but otherwise generating said second value of said control signal for said multiplexer;

a memory for reading samples of an ideal training signal free of multipath distortion to said first input port of said multiplexer; and a quantizer responding to said samples of said first FIR filter response for generating said corresponding samples applied to said second input port of said multiplexer.

4. A digital radio receiver for recovering digital samples of a modulating signal, in response to a received carrier wave modulated in accordance with a digital signal, which modulating signal is at times subject to undesirable amounts of multipath distortion, in combination with a channel-equalization filter comprising:

first and second finite-impulse-response (FIR) filters, each having a respective input port to which digital samples of said modulating signal are applied, each having a respective output port, and each being of an N-tap type, the taps of which are adaptively weighted, said first FIR filter responding to said modulating signal applied to its said input port to generate at its output port an output signal of said channel-equalization filter, and said second FIR filter responding to said modulating signal applied to its said input port to generate at its output port corrections for updating the tap weights of said first FIR filter;

a digital comparator connected for comparing samples of said first FIR filter response to corresponding samples of an ideal response, thereby to generate updated tap weights of said second FIR filter; and a digital signal processor responding during an initialization procedure to selected ones of pseudo-random sequences included in said modulating signal as training signals for characterizing the reception channel in discrete Fourier transform terms and generating a set of tap weights for said first FIR filter in accordance with an inverse discrete Fourier transform of the discrete Fourier transform characterizing the reception channel, which set of tap weights for said first FIR filter suppresses first FIR filter response to multipath reception.

5. A digital radio receiver for recovering digital samples of a modulating signal, in response to a received carrier wave modulated in accordance with a digital signal, which modulating signal is at times subject to undesirable amounts of multipath distortion, in combination with a channel-equalization filter comprising:

first and second finite-impulse-response (FIR) filters, each having a respective input port and a respective output port, and each being of an N-tap type, the N taps of which first FIR filter are capable of being adaptively weighted simultaneously during periodic updates thereof, the N taps of which second FIR filter are capable of being adaptively weighted simultaneously during periodic updates thereof;

first modulating-signal-application means for continually applying the digital samples of said modulating signal to said input port of said first FIR filter, said first FIR filter providing at its said output port digital samples of a first FIR filter response that is an output signal of said channel-equalization filter;

a digital comparator connected for comparing the digital samples of said first FIR filter response to corresponding digital samples of an ideal response, thereby to generate next-update tap weights for said second FIR filter during periods when said first FIR response is currently to a respective set of N consecutive digital samples of said modulating signal occurring ring after one of said periodic updates of said first FIR filter tap weights;

first temporary-storage means for temporarily storing the next-update tap weights for said second FIR filter during each period of their generation and thereafter applying the next-update tap weights for said second FIR filter to respective ones of its said N taps as updated tap weights thereby implementing one of said periodic updates of said second FIR filter tap weights;

second modulating-signal-application means for consecutively applying to the input port of said second FIR filter, after each of said periodic updates of said second FIR filter tap weights, the respective set of N consecutive digital samples of said modulating signal occurring after the just previous one of said periodic updates of said first FIR filter tap weights that generated the first FIR filter response from which the updated second FIR filter tap weights were generated by said digital comparator, responsive to which corrections for the tap weights of said first FIR filter are sequentially generated; and means for simultaneously applying the corrections for the tap weights of said first FIR filter after their sequential generation is completed, to respective ones of its said N taps as updated tap weights thereby implementing one of said periodic updates of said first FIR filter tap weights.

6. A combination as set forth in claim 5 wherein said means for simultaneously applying the corrections for the tap weights of said first FIR filter after their sequential generation is completed comprises:

second temporary-storage means for temporarily storing the tap weights of said first FIR filter and accumulating corrections thereto as they are generated; and means for thereafter transferring the corrected tap weights for said first FIR filter in parallel to said first FIR filter, thereby implementing one of said periodic updates of said first FIR filter tap weights.

7. A combination as set forth in claim 6 wherein said means for thereafter transferring the corrected tap weights for said first FIR filter in parallel to said first FIR filter includes therewithin:

a bank of "shadow" coefficient registers, connected for receiving said corrected tap weights for said first FIR filter sequentially from said means for temporarily storing the tap weights of said first FIR filter and accumulating corrections thereto, and further connected for transferring the corrected tap weights for said first FIR filter in parallel to said first FIR filter during each of said periodic updates of said first FIR filter tap weights.

8. A combination as set forth in claim 7 wherein said second modulating-signal-application means comprises:

a digital delay line having its input port connected at the input port of said first FIR filter and having its output port connected to the input port of said second FIR filter for continually applying delayed digital samples of said modulating signal to the input port of said second FIR filter.

9. A combination as set forth in claim 7 wherein said second temporary-storage means comprises:

a digital adder having a first summand input port for receiving said corrections for the tap weights for said first FIR filter as they are sequentially generated by said second FIR filter, a second summand input port, and a sum output port connected for supplying said corrected tap weights for said first FIR filter sequentially to said bank of "shadow" coefficient registers; and a bank of "former" coefficient registers to which said corrected tap weights for said first FIR filter are sequentially supplied from said sum output port of said digital adder for writing immediately after their previous contents are sequentially read to said second summand input port of said digital adder.

29

10. A combination as set forth in claim 7 wherein said second temporary-storage means comprises:
- means delaying the corrections for updating the tap weights of said first FIR filter, as those corrections are generated at the output port of said second FIR filter, for generating delayed corrections;
- a digital adder having a first summand input port for receiving said delayed corrections, a second summand input port, and a sum output port connected for supplying said corrected tap weights for said first FIR filter sequentially to said bank of "shadow" coefficient registers; and
- a bank of "former" coefficient registers to which said corrected tap weights for said first FIR filter are sequentially supplied from said sum output port of said digital adder for writing immediately after their previous contents are sequentially read to said second summand input port of said digital adder.

11. A combination as set forth in claim 7 wherein said second temporary-storage means comprises:
- a digital adder having a first summand input port for receiving said corrections for the tap weights for said first FIR filter as they are sequentially generated by said second FIR filter, a second summand input port, and a sum output port;
- a first delay line, having a respective input connection to which the sum output signal from said digital adder is applied for supplying updated first FIR filter tap weights, temporarily storing a first number of updated first FIR filter tap weights serially received at its respective input connection, and having an output connection for supplying delayed updated first FIR filter tap weights;
- a second delay line having a respective input connection for receiving delayed updated first FIR filter tap weights, temporarily storing a second number of updated first FIR filter tap weights serially received at its respective input connection, and having a respective output connection for supplying further delayed updated tap weights of said first FIR filter to said digital adder as the second summand input signal thereto, the first and second numbers having a sum equal to the number of tap weights of said first FIR filter; and
- means for applying the delayed updated tap weights of said first FIR filter, as supplied from the output connection of said first delay line, to said first FIR filter and to the input connection of said second delay line.

12. In a digital radio receiver for recovering digital samples of a modulating signal, in response to a received carrier wave modulated in accordance with a digital signal, which modulating signal is at times subject to undesirable amounts of multipath distortion, an adaptively-weighted channel-equalization filter for said modulating signal, which adaptively-weighted channel-equalization filter comprises:
- a clocking generator for generating a first clock signal at a first clocking frequency equal to the rate at which said digital samples of said modulating signal are recovered, for generating a second clock signal at a second clocking frequency that is a (2 L+2N)th submultiple of said first clocking frequency, and for generating a third clock signal at said second clocking frequency that is offset in phase from said second clock signal by (L+N) cycles of said first clocking frequency, N being a positive integer at least several tens and L being a relatively small positive integer, the frequencies and phases of said clock signals being controlled in response to an automatic-frequency-and-phase-control signal;

30

- an automatic-frequency-and-phase-control detector responding to said modulating signal for generating said automatic-frequency-and-phase-control signal;
- a first finite-impulse-response (FIR) filter including
  - a first bank of "shadow" filter-coefficient registers individually selected by a first address signal received at an address port thereof for being loaded via a coefficient load port thereof,
  - a first bank of "working" filter-coefficient registers loaded in parallel from corresponding ones of said "shadow" filter-coefficient registers in said first bank thereof responsive to said third clock signal received at a coefficient transfer command port thereof,
  - a multiple-bit-per-stage, (N−1)-stage, first shift register having a respective input port receptive of said digital samples of said modulating signal and having a plurality (N−1) in number of output ports from respective stages thereof that together comprise N taps, and
  - a first weighted summer for multiplying responses at the N taps of said first shift register by corresponding "working" filtering coefficients temporarily stored in said first bank of "working" filter-coefficient registers and adding the products to generate a first weighted sum supplied to a first FIR filter response port to provide the response of said adaptively-weighted channel-equalization filter;
- a second finite-impulse-response (FIR) filter including
  - a second bank of "shadow" filter-coefficient registers individually selected by a second address signal received at an address port thereof for being loaded via a coefficient load port thereof,
  - a second bank of "working" filter-coefficient registers loaded in parallel from corresponding ones of said "shadow" filter-coefficient registers in said second bank thereof responsive to said second clock signal received at a coefficient transfer command port thereof,
  - a multiple-bit-per-stage, (N−1)-stage, second shift register having a respective input port and a plurality (N−1) in number of output ports from respective stages thereof that together comprise N taps, and
  - a second weighted summer for multiplying responses at the N taps of said second shift register by corresponding "working" filtering coefficients temporarily stored in said first bank of "working" filter-coefficient registers and adding the products to generate a second weighted sum supplied to a second FIR filter response port after a latency of L samples;
- a digital delay line having an input port connected from the output port of the last stage of said first shift register and having an output port for supplying to the input port of said second shift register after a latency of L samples response to samples received at the input port of said digital delay line;
- a digital subtractor connected for subtractively combining the digital samples of said first weighted sum with corresponding digital samples of an ideal response, thereby to generate digital samples of a difference output signal applied to the coefficient load port of said second bank of "shadow" filter-coefficient registers;
- means, including said first bank of "shadow" filter-coefficient registers, responsive to a third clock signal for updating the contents of said first bank of "working" filter-coefficient registers; and
- an address generator including
  - a counter for counting cycles of said first clock signal to generate a count signal.

means for deriving from said count signal successive values of said first address within a prescribed range, beginning from a time L occurrences of said first clock signal later than each occurrence of said second clock signal and ending N occurrences of said first clock signal later, and means for deriving from said count signal successive values of said second address within said prescribed range, from a time L occurrences of said first clock signal later than each occurrence of said third clock signal and ending N occurrences of said first clock signal later.

13. An adaptively-weighted channel-equalization filter as set forth in claim 12 wherein said means responsive to a third clock signal for updating the contents of said first bank of "working" filter-coefficient registers further includes:

a digital adder having a sum output port and having first and second summand input ports;

means for applying to the coefficient load port of said first bank of "shadow" filter-coefficient registers, at least during times of normal operation, updated first FIR filter coefficients taken from the sum output port of said digital adder;

means for supplying a fraction of said second weighted sum to the first summand input port of said digital adder; and a bank of "former" filter-coefficient registers individually selected by said first address signal received at an address port thereof, for reading former filtering coefficients for said first FIR filter from the selected "former" filter-coefficient registers to the second summand input port of said digital adder and then writing them over with said updated filtering coefficients for said first FIR filter.

14. An adaptively-weighted channel-equalization filter as set forth in claim 13 wherein said means for applying updated filtering coefficients for said first FIR filter to the coefficient load port of said first bank of "shadow" filter-coefficient registers comprises:

a write multiplexer having an output port connected to the coefficient load port of said first bank of "shadow" filter-coefficient registers, having a first input port, having a second input port to which the sum output port of said digital adder connects, being conditioned by an applied control signal to reproduce signal supplied to its second input port only during said times of normal operation and to reproduce signal supplied to its first input port during other times.

15. An adaptively-weighted channel-equalization filter as set forth in claim 14 further comprising:

a digital signal processor connected for selectively receiving during times of initializing or re-initializing operation portions of said response of said adaptively-weighted channel-equalization filter containing known information, said digital signal processor being programmed for calculating starting values of filtering coefficients for said first FIR filter that are applied to said first input port of said write multiplexer, and said digital signal processor being programmed for generating said control signal for said write multiplexer, which control signal conditions said write multiplexer to reproduce signal supplied to its first input port during said times of initializing or re-initializing operation.

16. An adaptively-weighted channel-equalization filter as set forth in claim 15 further including means for generating said corresponding digital samples of said ideal response, comprising:

a quantizer responding to said samples of said first FIR filter response for generating said corresponding samples of said ideal response.

17. An adaptively-weighted channel-equalization filter as set forth in claim 15 further including means for generating said corresponding digital samples of said ideal response, comprising:

a memory, periodically read from during portions of said modulating signal the character of which is known, for generating said corresponding samples of said ideal response.

18. An adaptively-weighted channel-equalization filter as set forth in claim 15 further including means for generating said corresponding digital samples of said ideal response, comprising:

a further multiplexer having an output port connected for supplying said digital subtractor said corresponding digital samples of said ideal response, having first and second input ports, being conditioned by a control signal thereof having a first value for reproducing at the output port thereof signal received at the first input port thereof, and being conditioned by said control signal thereof having a second value for reproducing at the output port thereof signal received at the second input port thereof;

means for generating said control signal for said further multiplexer, responding to portions of said channel-equalization filter response to said modulating signal that contain a training signal for generating said first value of said control signal for said further multiplexer, but otherwise generating said second value of said control signal for said further multiplexer;

a memory for reading samples of an ideal training signal free of multipath distortion to said first input port of said further multiplexer; and a quantizer responding to said samples of said first FIR filter response for generating said corresponding samples applied to said second input port of said further multiplexer.

19. In a digital radio receiver for recovering digital samples of a modulating signal, in response to a received carrier wave modulated in accordance with a digital signal, which modulating signal is at times subject to undesirable amounts of multipath distortion, an adaptively-weighted channel-equalization filter for said modulating signal, which adaptively-weighted channel-equalization filter comprises:

a clocking generator for generating a first clock signal at a first clocking frequency equal to the rate at which said digital samples of said modulating signal are recovered, and for generating a second clock signal at a second clocking frequency that is an (L+N)th submultiple of said first clocking frequency, N being a positive integer at least several tens and L being a relatively small positive integer, the frequencies and phases of said clock signals being controlled in response to an automatic-frequency-and-phase-control signal;

an automatic-frequency-and-phase-control detector responding to said modulating signal for generating said automatic-frequency-and-phase-control signal;

a first finite-impulse-response (FIR) filter including a first bank of "shadow" filter-coefficient registers individually selected by a first address signal received at an address port thereof for being loaded via a coefficient load port thereof, a first bank of "working" filter-coefficient registers loaded in parallel from corresponding ones of said "shadow"

filter-coefficient registers in said first bank thereof responsive to said second clock signal received at a coefficient transfer command port thereof, a multiple-bit-per-stage, (N−1)-stage, first shift register having a respective input port receptive of said digital samples of said modulating signal and having a plurality (N−1) in number of output ports from respective stages thereof that together comprise N taps, and a first weighted summer for multiplying responses at the N taps of said first shift register by corresponding "working" filtering coefficients temporarily stored in said first bank of "working" filter-coefficient registers and adding the products to generate a first weighted sum supplied to a first FIR filter response port to provide the response of said adaptively-weighted channel-equalization filter;

a second finite-impulse-response (FIR) filter including a second bank of "shadow" filter-coefficient registers individually selected by a second address signal received at an address port thereof for being loaded via a coefficient load port thereof, a second bank of "working" filter-coefficient registers loaded in parallel from corresponding ones of said "shadow" filter*coefficient registers in said second bank thereof responsive to said second clock signal received at a coefficient transfer command port thereof, a multiple-bit-per-stage, (N−1)-stage, second shift register having a respective input port and a plurality (N−1) in number of output ports from respective stages thereof that together comprise N taps, and a second weighted summer for multiplying responses at the N taps of said second shift register by corresponding "working" filtering coefficients temporarily stored in said first bank of "working" filter-coefficient registers and adding the products to generate a second weighted sum supplied to a second FIR filter response port after a latency of L samples;

a digital delay line having an input port connected from the output port of the last stage of said first shift register and having an output port for supplying to the input port of said second shift register after a latency of L samples response to samples received at the input port of said digital delay line;

a digital subtractor connected for subtractively combining the digital samples of said first weighted sum with corresponding digital samples of an ideal response, thereby to generate digital samples of a difference output signal applied to the coefficient load port of said second bank of "shadow" filter-coefficient registers;

means, including said first bank of "shadow" filter-coefficient registers, responsive to said second clock signal for updating the contents of said first bank of "working" filter-coefficient registers; and an address generator including a counter for counting cycles of said first clock signal to generate a count signal, means for deriving from said count signal successive values of said first address within a prescribed range, beginning from a time L occurrences of said first clock signal later than each occurrence of said second clock signal and ending N occurrences of said first clock signal later, and means for deriving from said count signal successive values of said second address within said prescribed range, beginning from a time L occurrences of said first clock signal later than each occurrence of said second clock signal and ending N occurrences of said first clock signal later.

20. An adaptively-weighted channel-equalization filter as set forth in claim 19 wherein said means responsive to a third clock signal for updating the contents of said first bank of "working" filter-coefficient registers further includes:

a digital adder having a sum output port and having first and second summand input ports;

means for applying to the coefficient load port of said first bank of "shadow" filter-coefficient registers, at least during times of normal operation, updated first FIR filter coefficients taken from the sum output port of said digital adder;

means for supplying a fraction of said second weighted sum to the first summand input port of said digital adder; and a bank of "former" filter-coefficient registers individually selected by said first address signal received at an address port thereof, for reading former filtering coefficients for said first FIR filter from the selected "former" filter-coefficient registers to the second summand input port of said digital adder and then writing them over with said updated filtering coefficients for said first FIR filter.

21. An adaptively-weighted channel-equalization filter as set forth in claim 20 wherein said means for applying updated filtering coefficients for said first FIR filter to the coefficient load port of said first bank of "shadow" filter-coefficient registers comprises:

a write multiplexer having an output port connected to the coefficient load port of said first bank of "shadow" filter-coefficient registers, having a first input port, having a second input port to which the sum output port of said digital adder connects, being conditioned by an applied control signal to reproduce signal supplied to its second input port only during said times of normal operation and to reproduce signal supplied to its first input port during other times.

22. An adaptively-weighted channel-equalization filter as set forth in claim 21 further comprising:

a digital signal processor connected for selectively receiving during times of initializing or re-initializing operation portions of said response of said adaptively-weighted channel-equalization filter containing known information, said digital signal processor being programmed for calculating starting values of filtering coefficients for said first FIR filter that are applied to said first input port of said write multiplexer, and said digital signal processor being programmed for generating said control signal for said write multiplexer, which control signal conditions said write multiplexer to reproduce signal supplied to its first input port during said times of initializing or re-initializing operation.

23. An adaptively-weighted channel-equalization filter as set forth in claim 22 further including means for generating said corresponding digital samples of said ideal response, comprising:

a quantizer responding to said samples of said first FIR filter response for generating said corresponding samples of said ideal response.

24. An adaptively-weighted channel-equalization filter as set forth in claim 22 further including means for generating said corresponding digital samples of said ideal response, comprising:

a memory, periodically read from during portions of said modulating signal, the character of which portions of said modulating signal is known, for generating said corresponding samples of said ideal response.

25. An adaptively-weighted channel-equalization filter as set forth in claim 22 further including means for generating said corresponding digital samples of said ideal response, comprising:

a further multiplexer having an output port connected for supplying said digital subtractor said corresponding digital samples of said ideal response, having first and second input ports, being conditioned by a control signal thereof having a first value for reproducing at the output port thereof signal received at the first input port thereof, and being conditioned by said control signal thereof having a second value for reproducing at the output port thereof signal received at the second input port thereof;

means for generating said control signal for said further multiplexer, responding to portions of said channel-equalization filter response to said modulating signal that contain a training signal for generating said first value of said control signal for said further multiplexer, but otherwise generating said second value of said control signal for said further multiplexer;

a memory for reading samples of an ideal training signal free of multipath distortion to said first input port of said further multiplexer; and a quantizer responding to said samples of said first FIR filter response for generating said corresponding samples applied to said second input port of said further multiplexer.

26. In a digital radio receiver for recovering digital samples of a modulating signal, in response to a received carrier wave modulated in accordance with a digital signal, which modulating signal is at times subject to undesirable amounts of multipath distortion, an adaptively-weighted channel-equalization filter for said modulating signal, which adaptively-weighted channel-equalization filter comprises:

a clocking generator for generating a first clock signal at a first clocking frequency equal to the rate at which said digital samples of said modulating signal are recovered, for generating a second clock signal at a second clocking frequency that is an Nth submultiple of said first clocking frequency, and for generating a third clock signal at said second clocking frequency that lags said second clock signal by L cycles of said first clocking frequency, N being a positive integer at least several tens and L being a relatively positive integer, the frequencies and phases of said clock signals being controlled in response to an automatic-frequency-and-phase-control signal;

an automatic-frequency-and-phase-control detector responding to said modulating signal for generating said automatic-frequency-and-phase-control signal;

a first finite-impulse-response (FIR) filter including a first bank of "shadow" filter-coefficient registers individually selected by a first address signal received at an address port thereof for being loaded via a coefficient load port thereof, a first bank of "working" filter-coefficient registers loaded in parallel from corresponding ones of said "shadow" filter-coefficient registers in said first bank thereof responsive to said third clock signal received at a coefficient transfer command port thereof, a multiple-bit-per-stage, (N–1)-stage, first shift register having a respective input port receptive of said digital samples of said modulating signal and having a plurality (N–1) in number of output ports from respective stages thereof that together comprise N taps, and a first weighted summer for multiplying responses at the N taps of said first shift register by corresponding "working" filtering coefficients temporarily stored in said first bank of "working" filter-coefficient registers and adding the products to generate a first weighted sum supplied to a first FIR filter response port to provide the response of said adaptively-weighted channel-equalization filter;

a second finite-impulse-response (FIR) filter including a second bank of "shadow" filter-coefficient registers individually selected by a second address signal received at an address port thereof for being loaded via a coefficient load port thereof, a second bank of "working" filter-coefficient registers loaded in parallel from corresponding ones of said "shadow" filter-coefficient registers in said second bank thereof responsive to said second clock signal received at a coefficient transfer command port thereof, a multiple-bit-per-stage, (N–1)-stage, second shift register having a respective input port and a plurality (N–1) in number of output ports from respective stages thereof that together comprise N taps, and a second weighted summer for multiplying responses at the N taps of said second shift register by corresponding "working" filtering coefficients temporarily stored in said first bank of "working" filter-coefficient registers and adding the products to generate a second weighted sum supplied to a second FIR filter response port after a latency of L samples;

a first digital delay line having an input port connected from the output port of the last stage of said first shift register and having an output port for supplying to the input port of said second shift register after a latency of L samples response to samples received at the input port of said digital delay line;

a digital subtractor connected for subtractively combining the digital samples of said first weighted sum with corresponding digital samples of an ideal response, thereby to generate digital samples of a difference output signal applied to the coefficient load port of said second bank of "shadow" filter-coefficient registers;

means, including said first bank of "shadow" filter-coefficient registers, responsive to a third clock signal for updating the contents of said first bank of "working" filter-coefficient registers; and an address generator including a counter for counting cycles of said first clock signal to generate a count signal, means for deriving from said count signal successive values of said first address within a prescribed range, beginning from each occurrence of said third clock signal and ending N occurrences of said first clock signal later, and means for deriving from said count signal successive values of said second address within said prescribed range, beginning from a time L occurrences of said first clock signal later than each occurrence of said third clock signal and ending N occurrences of said first clock signal later.

27. An adaptively-weighted channel-equalization filter as set forth in claim 26 wherein said means responsive to a third clock signal for updating the contents of said first bank of "working" filter-coefficient registers further includes:

a digital adder having a sum output port and having first and second summarized input ports;

means for applying updated first FIR filter coefficients to the coefficient load port of said first bank of "shadow" filter-coefficient registers, as taken from the sum output port of said digital adder at least during times of normal operation;

means for applying to the coefficient load port of said first bank of "shadow" filter-coefficient registers, at least during times of normal operation, updated first FIR filter coefficients taken from the sum output port of said digital adder;

means for supplying to the first summand input port of said digital adder a fraction of said second weighted sum, as delayed by (N−2 L) occurrences of said first clock signal; and a bank of "former" filter-coefficient registers individually selected by said first address signal received at an address port thereof, for reading former filtering coefficients for said first FIR filter from the selected "former" filter-coefficient registers to the second summand input port of said digital adder and then writing them over with said updated filtering coefficients for said first FIR filter.

28. An adaptively-weighted channel-equalization filter as set forth in claim 27 wherein said means for applying updated filtering coefficients for said first FIR filter to the coefficient load port of said first bank of "shadow" filter-coefficient registers comprises:

a write multiplexer having an output port connected to the coefficient load port of said first bank of "shadow" filter-coefficient registers, having a first input port, having a second input port to which the sum output port of said digital adder connects, being conditioned by an applied control signal to reproduce signal supplied to its second input port only during said times of normal operation and to reproduce signal supplied to its first input port during other times.

29. An adaptively-weighted channel-equalization filter as set forth in claim 28 further comprising:

a digital signal processor connected for selectively receiving during times of initializing or re-initializing operation portions of said response of said adaptively-weighted channel-equalization filter containing known information, said digital signal processor being programmed for calculating starting values of filtering coefficients for said first FIR filter that are applied to said first input port of said write multiplexer, and said digital signal processor being programmed for generating said control signal for said write multiplexer, which control signal conditions said write multiplexer to reproduce signal supplied to its first input port during said times of initializing or re-initializing operation.

30. An adaptively-weighted channel-equalization filter as set forth in claim 29 further including means for generating said corresponding digital samples of said ideal response, comprising:

a quantizer responding to said samples of said first FIR filter response for generating said corresponding samples of said ideal response.

31. An adaptively-weighted channel-equalization filter as set forth in claim 29 further including means for generating said corresponding digital samples of said ideal response, comprising:

a memory, periodically read from during portions of said modulating signal, the character of which portions of said modulating signal is known, for generating said corresponding samples of said ideal response.

32. An adaptively-weighted channel-equalization filter as set forth in claim 29 further including means for generating said corresponding digital samples of said ideal response, comprising:

a further multiplexer having an output port connected for supplying said digital subtractor said corresponding digital samples of said ideal response, having first and second input ports, being conditioned by a control signal thereof having a first value for reproducing at the output port thereof signal received at the first input port thereof, and being conditioned by said control signal thereof having a second value for reproducing at the output port thereof signal received at the second input port thereof;

means for generating said control signal for said further multiplexer, responding to portions of said channel-equalization filter response to said modulating signal that contain a training signal for generating said first value of said control signal for said further multiplexer, but otherwise generating said second value of said control signal for said further multiplexer;

a memory for reading samples of an ideal training signal free of multipath distortion to said first input port of said further multiplexer; and a quantizer responding to said samples of said first FIR filter response for generating said corresponding samples applied to said second input port of said further multiplexer.

33. An adaptively-weighted channel-equalization filter as set forth in claim 26 wherein said means responsive to a third clock signal for updating the contents of said first bank of "working" filter-coefficient registers further includes:

a digital adder having a sum output port and having first and second summand input ports;

means for supplying to the first summand input port of said digital adder a fraction of said second weighted sum;

a second digital delay line having an input port connected from the sum output port of said digital adder and having an output port for supplying response to samples received at the input port of said digital delay line after a latency period of 2 L samples;

means for applying to the coefficient load port of said first bank of "shadow" filter-coefficient registers, at least during times of normal operation, updated first FIR filter coefficients taken from the sum output port of said digital adder; and a third digital delay line for supplying updated first FIR filter filtering coefficients to the first summand input port of said digital adder, as delayed by (N−2 L) samples.

34. An adaptively-weighted channel-equalization filter as set forth in claim 33 wherein said means for applying updated filtering coefficients for said first FIR filter to the coefficient load port of said first bank of "shadow" filter-coefficient registers comprises:

a write multiplexer having an output port connected to the coefficient load port of said first bank of "shadow" filter-coefficient registers, having a first input port, having a second input port to which the output port of said second digital delay line connects, being conditioned by an applied control signal to reproduce signal supplied to its second input port only during said times of normal operation and to reproduce signal supplied to its first input port during other times.

35. An adaptively-weighted channel-equalization filter as set forth in claim 34 further comprising:

a digital signal processor connected for selectively receiving during times of initializing or re-initializing operation portions of said response of said adaptively-weighted channel-equalization filter containing known information, said digital signal processor being programmed for calculating starting values of filtering coefficients for said first FIR filter that are applied to said first input port of said write multiplexer, and said digital signal processor being programmed for generating said control signal for said write multiplexer, which control signal conditions said write multiplexer to reproduce signal supplied to its first input port during said times of initializing or re-initializing operation.

36. An adaptively-weighted channel-equalization filter as set forth in claim 35 further including means for generating said corresponding digital samples of said ideal response, comprising:

a quantizer responding to said samples of said first FIR filter response for generating said corresponding samples of said ideal response.

37. An adaptively-weighted channel-equalization filter as set forth in claim 35 further including means for generating said corresponding digital samples of said ideal response, comprising:

a memory, periodically read from during portions of said modulating signal the character of which is known, for generating said corresponding samples of said ideal response.

38. An adaptively-weighted channel-equalization filter as set forth in claim 35 further including means for generating said corresponding digital samples of said ideal response, comprising:

a further multiplexer having an output port connected for supplying said digital subtractor said corresponding digital samples of said ideal response, having first and second input ports, being conditioned by a control signal thereof having a first value for reproducing at the output port thereof signal received at the first input port thereof, and being conditioned by said control signal thereof having a second value for reproducing at the output port thereof signal received at the second input port thereof;

means for generating said control signal for said further multiplexer, responding to portions of said channel-equalization filter response to said modulating signal that contain a training signal for generating said first value of said control signal for said further multiplexer, but otherwise generating said second value of said control signal for said further multiplexer;

a memory for reading samples of an ideal training signal free of multipath distortion to said first input port of said further multiplexer; and a quantizer responding to said samples of said first FIR filter response for generating said corresponding samples applied to said second input port of said further multiplexer.

39. A digital radio receiver for recovering digital samples of a modulating signal, in response to a received carrier wave modulated in accordance with a digital signal, which modulating signal is at times subject to undesirable amounts of multipath distortion, in combination with a channel-equalization filter comprising;

first and second finite-impulse-response (FIR) filters, each having a respective input port, each having a respective output port, and each being of an N-tap type, the taps of which are adaptively weighted, wherein the digital samples of said modulating signal are applied in normal time sequence to the input port of said first FIR filter and said first FIR filter responds to generate at its output port an output signal of said channel-equalization filter, wherein the digital samples of said modulating signal are applied in delayed normal time sequence to the input port of said second FIR filter and said second FIR filter responds to said modulating signal applied to its said input port in a delayed normal time sequence to generate at its output port corrections for updating the tap weights of said first FIR filter; and a digital comparator connected for comparing samples of said first FIR filter response to corresponding samples of an ideal response, thereby to generate samples of an error signal, wherein said samples of said error signal are applied in reverse order of their generation as updated tap weights for successive taps of said second FIR filter.

40. A digital radio receiver for recovering digital samples of a modulating signal, in response to a received carrier wave modulated in accordance with a digital signal, which modulating signal is at times subject to undesirable amounts of multipath distortion in combination with a channel-equalization filter comprising:

first and second finite-impulse-response (FIR) filters, each having a respective input to which digital samples of said modulating signal are applied, each having a respective output port, and each being of an N-tap type, the taps of which are adaptively weighted, said first FIR filter responding to said modulating signal applied to its said input port in normal time sequence to generate at its output port an output signal of said channel-equalization filter, and said second FIR filter responding to said modulating signal applied to its said input port in delayed normal time sequence to generate at its output port corrections for updating the tap weights of said first FIR filter;

a digital comparator connected for comparing samples of said first FIR filter response to corresponding samples of an ideal response, thereby to generate updated tap weights of said second FIR filter; and serial-to-parallel conversion circuitry, serially receiving the updated tap weights of said second FIR filter as generated by said digital comparator, assembling a set of respective updated tap weights of said second FIR filter for each tap thereof, and applying each fully assembled set of respective updated tap weights of said second FIR filter in parallel to the taps of said second FIR filter until a next set of respective updated tap weights of said second FIR filter for each tap thereof is fully assembled, the respective updated tap weights of said second FIR filter in each set thereof being applied in reverse order of their generation to the succeeding taps of said second FIR filter.

41. A digital radio receiver for recovering digital samples of a modulating signal, in response to a received carrier wave modulated in accordance with a digital signal, which modulating signal is at times subject to undesirable amounts of multipath distortion, in combination with a channel-equalization filter comprising:

first and second finite-impulse-response (FIR) filters, each having a respective input port to which digital samples of said modulating signal are applied, each having a respective output port, and each being of an N-tap type, the taps of which are adaptively weighted, said first FIR filter responding to said modulating signal applied to its said input port to generate at its output port an output signal of said channel-equalization filter, and said second FIR filter responding to said modulating signal applied to its said input port in normal time sequence to generate at its output port corrections for updating the tap weights of said first FIR filter;

a digital comparator connected for comparing samples of said first FIR filter response to corresponding samples of an ideal response, thereby to generate updated tap weights of said second FIR filter;

a bank of coefficient accumulation registers for respectively accumulating the corrections for updating the tap weights of said first FIR filter, as those corrections are generated at the output port of said second FIR filter, with the previous values of the corresponding tap weights of said first FIR filter, thereby to generate sets of Updated tap weights of said first FIR filter, each said set of updated tap weights of said first FIR filter containing a respective updated tap weight for each tap of said first FIR filter;

means for applying said updated tap weights in each said set of updated tap weights of said first FIR filter simultaneously to said first FIR filter after the generation of that set has been completed and before the generation of a next set is begun; and serial-to-parallel conversion circuitry, serially receiving the updated tap weights of said second FIR filter as generated by said digital comparator, assembling a set of respective updated tap weights of said second FIR filter for each tap thereof, and applying each fully assembled set of respective updated tap weights of said second FIR filter in parallel to the taps of said second FIR filter until a next set of respective updated tap weights of said second FIR filter for each tap thereof is fully assembled, the respective updated tap weights of said second FIR filter in each set thereof being applied in reverse order of their generation to the succeeding taps of said second FIR filter.

42. A digital radio receiver for recovering digital samples of a modulating signal, in response to a received carrier wave modulated in accordance with a digital signal, which modulating signal is at times subject to undesirable amounts of multipath distortion, in combination with a channel-equalization filter comprising: first and second finite-impulse-response (FIR) filters, each having a respective input port, each having a respective output port, and each being of an N-tap type, the taps of which are adaptively weighted, said first FIR filter responding to said modulating signal applied in normal time sequence to its said input port to generate at its output port an output signal of said channel-equalization filter, said second FIR filter responding to said modulating signal applied in normal time sequence to its said input port to generate at its output port corrections for updating the tap weights of said first FIR filter; and a digital comparator connected for comparing samples of said first FIR filter response to corresponding samples of an ideal response, thereby to generate updated tap weights of said second FIR filter applied in reverse order of their generation to the succeeding taps of said second FIR filter.

43. A combination as set forth in claim 42, wherein said first FIR filter has a direct-form structure.

44. A combination as set forth in claim 43, wherein said second FIR filter has a direct-form structure.

45. A digital radio receiver for recovering digital samples of a modulating signal, in response to a received carrier wave modulated in accordance with a digital signal, which modulating signal is at times subject to undesirable amounts of multipath distortion, in combination with a channel-equalization filter comprising:

first and second finite-impulse-response (FIR) filters, each having a respective input port to which digital samples of said modulating signal are applied, each having a respective output port, and each being of an N-tap type, the taps of which are adaptively weighted, said first FIR filter responding to said modulating signal applied in normal time sequence to its said input port to generate at its output port an output signal of said channel-equalization filter, said second FIR filter responding to said modulating signal applied in normal time sequence to its said input port to generate at its output port corrections for updating the tap weights of said first FIR filter;

a digital comparator connected for comparing samples of said first FIR filter response to corresponding samples of an ideal response, thereby to generate updated tap weights of said second FIR filter, thereby to generate updated tap weights of said second FIR filter applied in reverse order of their generation to the succeeding taps of said second FIR filter;

a bank of coefficient accumulation registers for respectively accumulating the corrections for updating the tap weights of said first FIR filter, as those corrections are generated at the output port of said second FIR filter, with the previous values of the corresponding tap weights of said first FIR filter, thereby to generate sets of updated tap weights of said first FIR filter, each said set of updated tap weights of said first FIR filter containing a respective updated tap weight for each tap of said first FIR filter; and means for applying said updated tap weights in each said set of updated tap weights of said first FIR filter simultaneously to said first FIR filter after the generation of that set has been completed and before the generation of a next set is begun.

46. A combination as set forth in claim 45, wherein said first FIR filter has a direct-form structure.

47. A combination as set forth in claim 46, wherein said second FIR filter has a direct-form structure.

* * * * *